(12) United States Patent
Shinohara et al.

(10) Patent No.: US 9,709,775 B2
(45) Date of Patent: *Jul. 18, 2017

(54) IMAGING LENS AND IMAGING APPARATUS EQUIPPED WITH THE IMAGING LENS

(71) Applicant: FUJIFILM Corporation, Tokyo (JP)

(72) Inventors: Yoshikazu Shinohara, Saitama (JP); Kazuya Yoneyama, Saitama (JP); Michio Cho, Saitama (JP); Yoshiaki Ishii, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 8 days.

This patent is subject to a terminal disclaimer.

(21) Appl. No.: 14/863,459

(22) Filed: Sep. 24, 2015

(65) Prior Publication Data

US 2016/0011405 A1 Jan. 14, 2016

Related U.S. Application Data

(63) Continuation of application No. PCT/JP2013/007641, filed on Dec. 26, 2013.

(30) Foreign Application Priority Data

Mar. 26, 2013 (JP) .................. 2013-063612

(51) Int. Cl.
*G02B 13/18* (2006.01)
*G02B 3/02* (2006.01)
(Continued)

(52) U.S. Cl.
CPC ......... *G02B 13/0045* (2013.01); *G02B 5/005* (2013.01); *G02B 9/62* (2013.01);
(Continued)

(58) Field of Classification Search
CPC .. G02B 13/0045; G02B 9/62; G02B 27/0025; G02B 13/18; G02B 5/005; G02B 3/04; G02B 13/002
(Continued)

(56) References Cited

U.S. PATENT DOCUMENTS 8,934,178 B2 1/2015 Tang et al.
2014/0111876 A1* 4/2014 Tang .................. G02B 13/0045
359/757

(Continued)

FOREIGN PATENT DOCUMENTS

JP 2014-013293 1/2014
KR 2010-0040357 4/2010
TW 201305595 2/2013

OTHER PUBLICATIONS

"Written Opinion of the International Searching Authority of PCT/JP2013/007641", this report contains the following items: Form PCT/ISA237 (cover sheet), PCT/ISA237 (Box No. I), PCT/ISA237 (Box No. V) and PCT/ISA237 (Box No. VI), mailed on Apr. 8, 2014, with a partial English translation thereof, pp. 1-7.

*Primary Examiner* — Evelyn A Lester
(74) *Attorney, Agent, or Firm* — Jianq Chyun IP Office

(57) ABSTRACT

An imaging lens is constituted by six lenses, including, in order from the object side to the image side: a positive first lens having a convex surface toward the object side; a negative second lens; a positive third lens, which is a meniscus lens having a convex surface toward the object side; a positive fourth lens; a negative fifth lens having a concave surface toward the object side; and a negative sixth lens, of which the image toward the image side is of an aspherical shape which is concave in the vicinity of the optical axis and convex at the peripheral portion thereof. Conditional formulae related to the focal length f of the
(Continued)

entire lens system, the focal length f1 of the first lens, and the focal length f4 of the fourth lens is satisfied.

15 Claims, 14 Drawing Sheets

(51) Int. Cl.
    *G02B 9/62*     (2006.01)
    *G02B 13/00*     (2006.01)
    *G02B 5/00*     (2006.01)
    *G02B 27/00*     (2006.01)
    *G02B 3/04*     (2006.01)

(52) U.S. Cl.
    CPC ............ *G02B 27/0025* (2013.01); *G02B 3/04* (2013.01); *G02B 13/002* (2013.01); *G02B 13/18* (2013.01)

(58) Field of Classification Search
    USPC .......................... 359/713, 739, 740, 756, 757
    See application file for complete search history.

(56) References Cited

U.S. PATENT DOCUMENTS

| | | |
|---|---|---|
| 2015/0085379 A1 | 3/2015 | Tang et al. |
| 2015/0260961 A1* | 9/2015 | Ota ................... G02B 13/0045 359/713 |

\* cited by examiner

EXAMPLE 1

EXAMPLE 5

EXAMPLE 6

FIG.9 EXAMPLE 2

IMAGING LENS AND IMAGING APPARATUS EQUIPPED WITH THE IMAGING LENS

CROSS REFERENCE TO RELATED APPLICATIONS

The present application is a Continuation of PCT International Application No. PCT/JP2013/007641 filed on Dec. 26, 2013, which claims priority under 35 U.S.C. §119(a) to Japanese Patent Application No. 2013-063612 filed on Mar. 26, 2013. Each of the above applications is hereby expressly incorporated by reference in its entirety, into the present application.

BACKGROUND

The present disclosure is related to a fixed focus imaging lens for forming optical images of subjects onto an imaging element such as a CCD (Charge Coupled Device) and a CMOS (Complementary Metal Oxide Semiconductor). The present disclosure is also related to an imaging apparatus provided with the imaging lens that performs photography such as a digital still camera, a cellular telephone with a built in camera, a PDA (Personal Digital Assistant), a smart phone, a tablet type terminal, and a portable gaming device.

Accompanying the recent spread of personal computers in households, digital still cameras capable of inputting image data such as photographed scenes and portraits into personal computers are rapidly becoming available. In addition, many cellular telephones, smart phones, and tablet type terminals are being equipped with camera modules for inputting images. Imaging elements such as CCD's and CMOS's are employed in these devices having photography functions. Recently, the resolutions of these imaging elements are increasing, and there is demand for increased resolution and increased performance in imaging lenses. This trend is particularly significant in smart phones. In recent years, six lens configurations are becoming the mainstream in imaging lenses which are mounted in smart phones. The imaging lens disclosed in Korean Patent Publication No. 2010-0040357 below has been proposed as an imaging lens having a six lens configuration in the above field.

SUMMARY

Miniaturization of imaging elements is also advancing recently. There is demand for miniaturization of imaging devices as a whole and imaging lenses to be mounted therein. Further, there is increasing demand for a shortening of the total length of imaging lenses to be mounted in devices which are becoming progressively thinner, such as cellular telephones, smart phones, and tablet type terminals. In addition, imaging lenses having wider angles of view are in demand for imaging apparatuses such as cellular telephones, smart phones, and tablet type terminals, which are often employed to enlarge photographed images with a digital zoom function, in order to realize a wider photography range. The imaging lens having the six lens configuration disclosed in Korean Patent Publication No. 2010-0040357 has an angle of view of approximately 42 degrees, and is also required to have a further shortened total length in order to meet the above demand.

The present disclosure has been developed in view of the foregoing points. The present disclosure provides an imaging lens that can realize a shortening of the total length, a wide angle of view, and high imaging performance which is compatible with a greater number of pixels. The present disclosure also provides an imaging apparatus equipped with the lens, which is capable of obtaining high resolution photographed images.

An imaging lens of the present disclosure consists of six lenses, including, in order from the object side to the image side:

a first lens having a positive refractive power and a convex surface toward the object side;

a second lens having a negative refractive power;

a third lens, which is a meniscus lens having a positive refractive power and a convex surface toward the object side;

a fourth lens having a positive refractive power;

a fifth lens having a negative refractive power and a concave surface toward the object side; and a sixth lens having a negative refractive power, of which the image toward the image side is of an aspherical shape which is concave in the vicinity of the optical axis and convex at the peripheral portion thereof;

the conditional formulae below being satisfied:

$$1.54 < f/f4 < 3 \tag{1}$$

$$0.5 < f/f1 < 1 \tag{2}$$

wherein f is the focal length of the entire lens system, f1 is the focal length of the first lens, and f4 is the focal length of the fourth lens.

It is preferable for one of Conditional Formulae (1-1) through (4-2) below to be satisfied in the imaging lens of the present disclosure. Note that as a preferred aspect, any one or arbitrary combinations of Conditional Formulae (1-1) through (4-2) may be satisfied.

$$1.55 < f/f4 < 2.5 \tag{1-1}$$

$$1.55 < f/f4 < 2.2 \tag{1-2}$$

$$0.5 < f/f1 < 1 \tag{2}$$

$$0.6 < f/f1 < 0.95 \tag{2-1}$$

$$0.65 < f/f1 < 0.9 \tag{2-2}$$

$$-0.3 < f/f23456 < 0.4 \tag{3}$$

$$-0.2 < f/f23456 < 0.3 \tag{3-1}$$

$$-0.15 < f/f23456 < 0.25 \tag{3-2}$$

$$-0.7 < (R1f - R1r)/(R1f + R1r) < 0 \tag{4}$$

$$-0.65 < (R1f - R1r)/(R1f + R1r) < -0.1 \tag{4-1}$$

$$-0.62 < (R1f - R1r)/(R1f + R1r) < -0.2 \tag{4-2}$$

wherein f is the focal length of the entire lens system, f1 is the focal length of the first lens, f4 is the focal length of the fourth lens, f23456 is the combined focal length of the second lens through the sixth lens, R1f is the paraxial radius of curvature of the surface of the first lens toward the object side, and R1r is the paraxial radius of curvature of the surface of the first lens toward the image side.

In the imaging lens of the present disclosure, it is preferable for the second lens to be a meniscus lens having a convex surface toward the object side.

In the imaging lens of the present disclosure, it is preferable for the fourth lens to be a meniscus lens having a concave surface toward the object side.

In the imaging lens of the present disclosure, it is preferable for an aperture stop to be positioned at the object side of the surface of the second lens toward the object side.

Note that in the imaging lenses of the present disclosure, the expression "consists of six lenses" means that the imaging lens of the present disclosure may also include lenses that practically have no power, optical elements other than lenses such as a stop and a cover glass, and mechanical components such as lens flanges, a lens barrel, an imaging element, a camera shake correcting mechanism, etc., in addition to the six lenses.

Note that in the imaging lenses of the present disclosure and the preferred configurations thereof, the shapes of the surfaces of the lenses and the signs of the refractive indices thereof are considered in the paraxial region in the case that the lenses include aspherical surfaces. In addition, the signs of the paraxial radii of curvature are positive in cases that the surface shape is convex toward the object side, and negative in cases that the surface shape is convex toward the image side.

An imaging apparatus of the present disclosure is equipped with an imaging lens of the present disclosure.

According to the imaging lenses of the present disclosure, the configuration of each lens element is optimized within a lens configuration having six lenses as a whole. Particularly, the shapes of the first lens, the third lens, the fifth lens, and the sixth lens are favorably configured, and the refractive power of the fourth lens is favorably set. In addition, the imaging lenses are configured such that a predetermined conditional formula is satisfied. Therefore, a lens system that can achieve a short total length and has high imaging performance can be realized.

The imaging apparatus of the present disclosure is equipped with an imaging lens of the present disclosure as described above. Therefore, it is possible to shorten the size of the apparatus in the direction of the optical axis of the imaging lens, and the imaging apparatus of the present disclosure is capable of obtaining high resolution photographed images.

DESCRIPTION OF THE PREFERRED EMBODIMENTS

Hereinafter, embodiments of the present disclosure will be described in detail with reference to the attached drawings.

Figure 1:
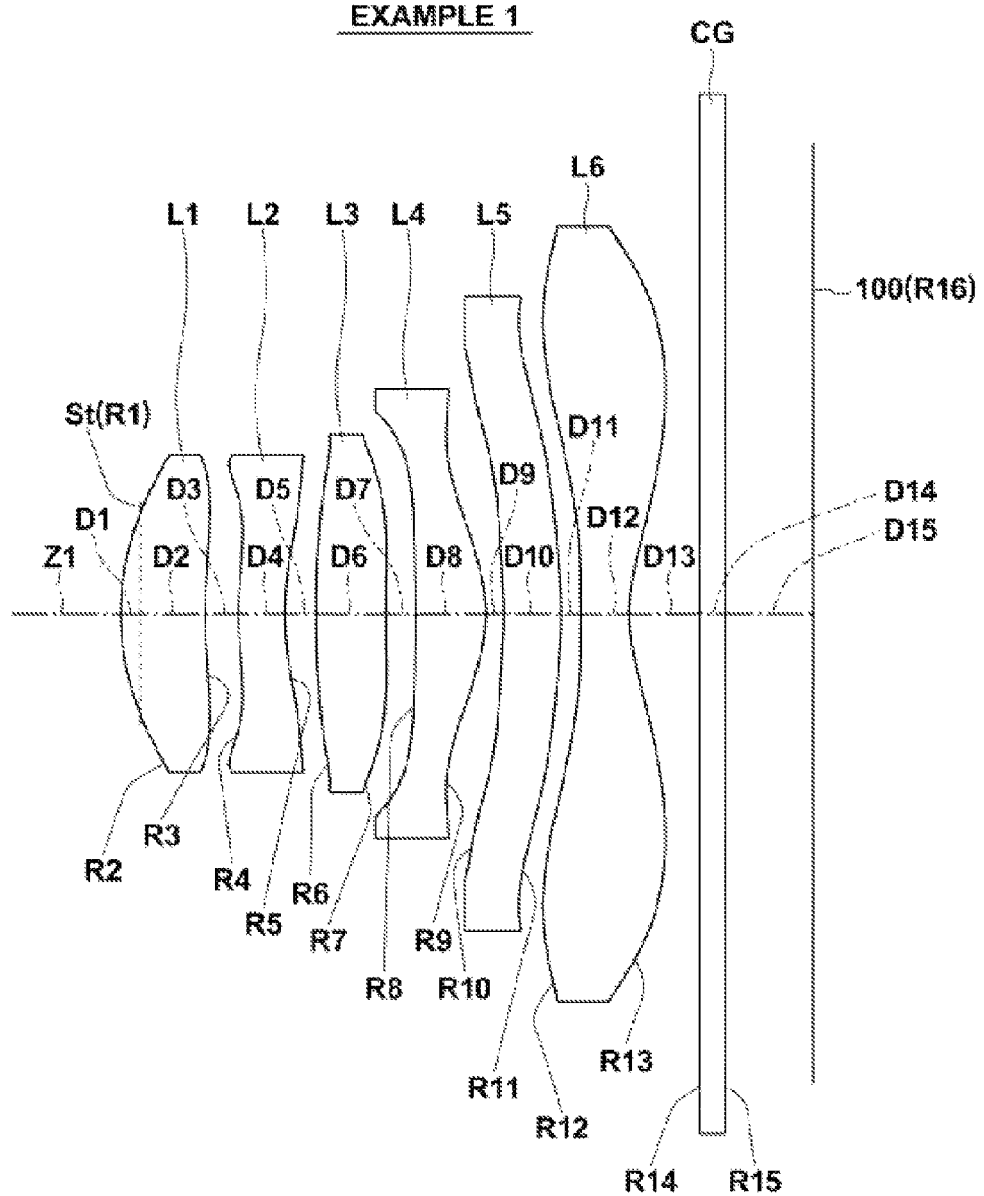
FIG. 1 is a sectional diagram that illustrates a first example of the configuration of an imaging lens according to an embodiment of the present disclosure, and corresponds to a lens of Example 1.
Figure 7:
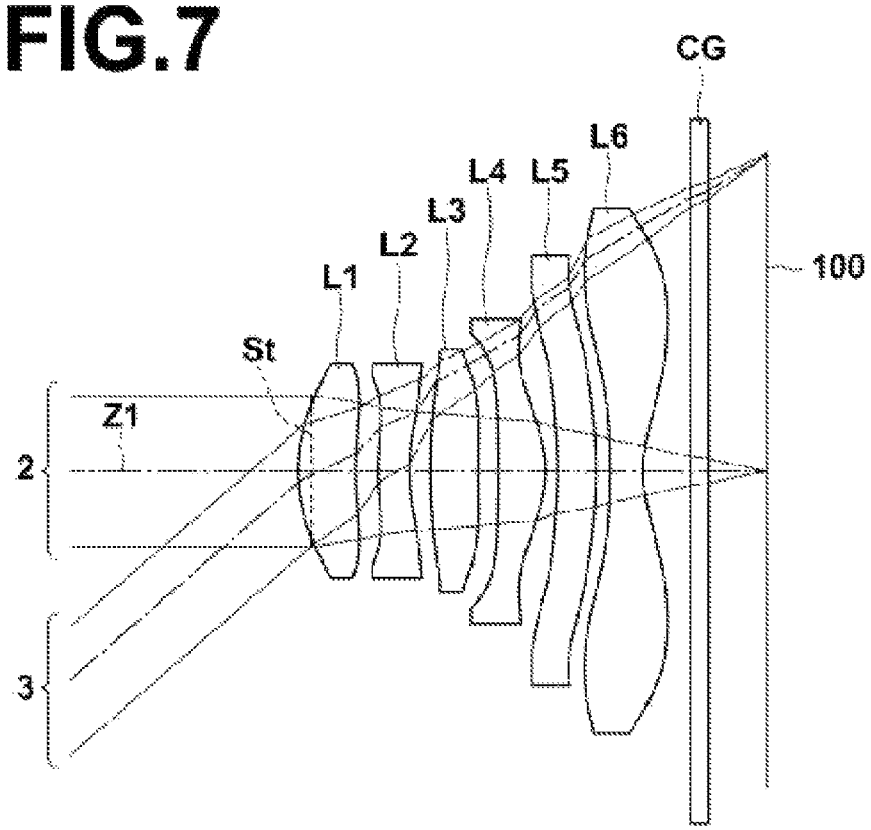
FIG. 7 is a diagram that illustrates the paths of light rays that pass through the imaging lens of FIG. 1.

FIG. 1 illustrates a first example of the configuration of an imaging lens according to an embodiment of the present disclosure. This example corresponds to the lens configuration of Numerical Example 1 (Table 1 and Table 2), to be described later. Similarly, FIG. 2 through FIG. 6 are sectional diagrams that illustrate second through seventh examples of lens configurations that correspond to Numerical Examples 2 through 6 (Table 3 through Table 12). In FIGS. 1 through 6, the symbol Ri represents the radii of curvature of ith (i=1, 2, 3, . . . ) surfaces. The symbol Di represents the distances between an ith surface and an i+1 st surface along an optical axis Z1. Note that the basic configurations of the examples are the same, and therefore a description will be given of the imaging lens of FIG. 1 as a base. In addition, FIG. 7 is a diagram that illustrates the paths of light rays that pass through the imaging lens L of FIG. 1. FIG. 7 illustrates the paths of axial light beams 2 and maximum angle of view light beams 3 from an object at a distance of infinity.

The imaging lens of the embodiment of the present disclosure is favorably employed in various imaging devices that employ imaging elements such as a CCD and a CMOS. The imaging lens of the embodiment of the present disclosure is particularly favorable for use in comparatively miniature portable terminal devices, such as a digital still camera, a cellular telephone with a built in camera, a smart phone, a tablet type terminal, and a PDA.

Figure 14:
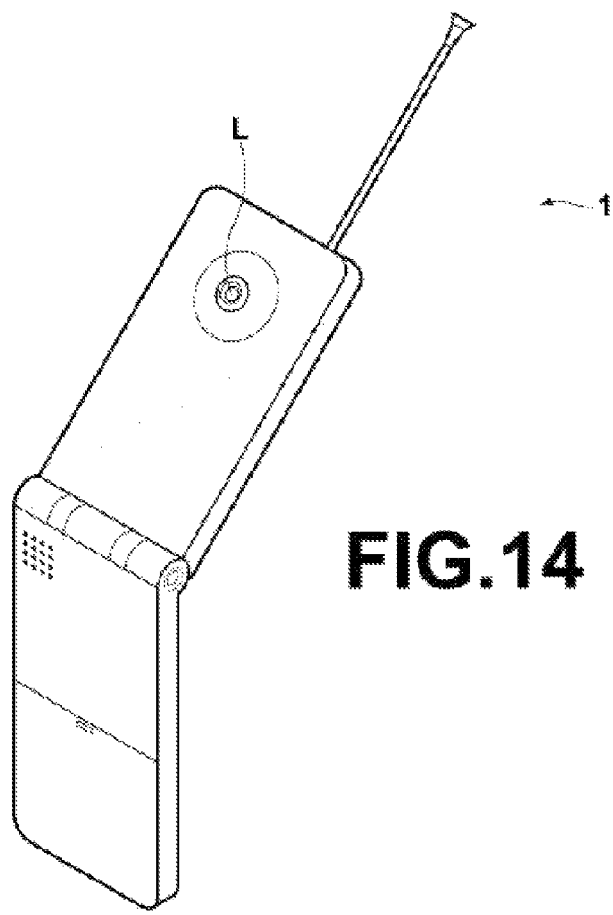
FIG. 14 is a diagram that illustrates a cellular telephone as an imaging apparatus equipped with the imaging lens of the present disclosure.

FIG. 14 schematically illustrates a cellular telephone as an imaging apparatus 1 according to an embodiment of the present disclosure. The imaging apparatus 1 of the embodiment of the present disclosure is equipped with an imaging lens L according to the embodiment of the present disclosure and an imaging element 100 (refer to FIG. 1) such as a CCD that outputs image signals corresponding to optical images formed by the imaging lens L. The imaging element 100 is provided at an image formation plane (imaging surface R16) of the imaging lens L.

Figure 15:
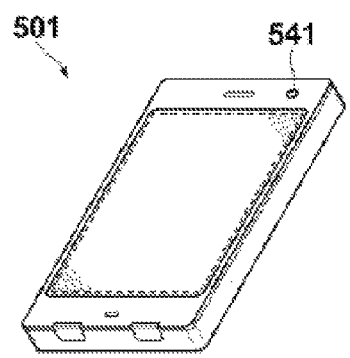
FIG. 15 is a diagram that illustrates a smart phone as an imaging apparatus equipped with the imaging lens of the present disclosure.

FIG. 15 schematically illustrates a smart phone as an imaging apparatus 501 according to an embodiment of the present disclosure. The imaging apparatus 501 of the embodiment of the present disclosure is equipped with a camera section 541 having the imaging lens L according to the embodiment of the present disclosure and an imaging element 100 (refer to FIG. 1) such as a CCD that outputs image signals corresponding to optical images formed by the imaging lens L.

As illustrated in FIG. 1, the imaging lens L is equipped with, in order from the object side to the image side, a first lens L1, a second lens L2, a third lens L3, a fourth lens L4, a fifth lens L5, and a sixth lens L6, provided along the optical axis Z1.

Various optical members CG may be provided between the sixth lens L6 and the imaging element 100, depending on the configuration of the camera to which the lens is applied. A planar optical member such as a cover glass for protecting the imaging surface and an infrared cutoff filter may be provided, for example. In this case, a planar cover glass having a coating having a filtering effect such as an infrared cutoff filter coating or an ND filter coating, or a material that exhibits similar effects, may be utilized as the optical member CG.

Alternatively, the optical member CG may be omitted, and a coating may be administered on the sixth lens L6 to obtain the same effect as that of the optical member CG In this case, the number of parts can be reduced, and the total length can be shortened.

It is preferable for the imaging lens L to be equipped with an aperture stop St positioned at the object side of the surface of the second lens L2 toward the object side. In the case that the aperture stop St is positioned at the object side of the surface of the second lens L2 toward the object side in this manner, increases in the incident angles of light rays that pass through the optical system and enter the image formation plane (imaging element) can be suppressed, particularly at peripheral portions of an imaging region, which is advantageous from the viewpoint of widening the angle of view. It is more preferable for the aperture stop St to be positioned at the image side of the surface of the first lens L1 toward the object side. By positioning the aperture stop St at the object side of the surface of the first lens L1 toward the image side in this manner, increases in the incident angles of light rays that pass through the optical system and enter the image formation plane (imaging element) can be more favorably suppressed, and higher optical performance can be realized.

Note that the expression "positioned at the object side of the surface of the second lens L2 toward the object side" means that the position of the aperture stop in the direction of the optical axis is at the same position as the intersection of marginal axial rays of light and the surface of the second lens L2 toward the object side, or more toward the object side than this position. Note that the expression "positioned at the image side of the surface of the first lens L1 toward the object side" means that the position of the aperture stop in the direction of the optical axis is at the same position as the intersection of marginal axial rays of light and the surface of the first lens L1 toward the image side, or more toward the object side than this position.

In the present embodiment, the aperture stop St is positioned at the image side of the apex of the surface of the first lens L1 toward the object side. However, the present disclosure is not limited to this configuration, and the aperture stop St may be positioned at the object side of the apex of the surface of the first lens L1 toward the object side. A case in which the aperture stop St is positioned at the object side of the apex of the surface of the first lens L1 toward the object side is somewhat disadvantageous from the viewpoint of securing peripheral light intensity compared to a case in which the aperture stop St is positioned at the image side of the apex of the surface of the first lens L1 toward the object side. However, increases in the incident angles of light rays that pass through the optical system and enter the image formation plane (imaging element) can be further suppressed at the peripheral portions of the imaging region. Note that the aperture stops St illustrated in FIG. 1 through FIG. 7 do not necessarily represent the sizes or shapes thereof, but indicate the positions thereof on the optical axis Z1.

In the imaging lens L, the first lens L1 has a positive refractive power in the vicinity of the optical axis, and has a convex surface toward the object side in the vicinity of the optical axis. This configuration enables a favorable shortening of the total length of the lens. In addition, by configuring the first lens L1 to have a convex surface toward the object side, the surface of the lens system most toward the object side is convex. Therefore, rearward principal point of the imaging lens can be moved toward the object side, and the total length of the lens can be favorably shortened. It is preferable for the first lens L1 to be a meniscus lens having a convex surface toward the object side in the vicinity of the optical axis. This configuration is even more advantageous from the viewpoint of shortening the total length of the lens.

The second lens L2 has a negative refractive power in the vicinity of the optical axis. It is preferable for the second lens L2 to have a concave surface toward the image side in the vicinity of the optical axis. This configuration is advantageous from the viewpoint of shortening the total length of the lens. In addition, it is preferable for the second lens L2 to be a meniscus lens in the vicinity of the optical axis. This configuration is even more advantageous from the viewpoints of shortening the total length of the lens and widening the angle of view. In addition, in the case that the second lens L2 has a convex surface toward the object side in the vicinity of the optical axis, the total length can be even more favorably shortened, and differences in spherical aberration depending on wavelength can be suppressed with respect to light rays of different wavelengths.

The third lens L3 has a positive refractive power in the vicinity of the optical axis, and is a meniscus lens having a convex surface toward the object side in the vicinity of the optical axis. Configuring the third lens L3 to be a meniscus lens having a convex surface toward the object side in the vicinity of the optical axis is advantageous from the viewpoints of shortening the total length of the lens and widening the angle of view. In addition, by configuring the third lens L3 to be of a shape having a convex surface toward the object side in the vicinity of the optical axis, the convex surface of the third lens L3 toward the object side will correspond with the concave surface of the second lens L2 in the case that the surface of the second lens L2 toward the image side is concave. Therefore, the distance along the optical axis between the second lens L2 and the third lens L3 can be shortened, and the total length of the lens can be shortened further.

The fourth lens L4 has a positive refractive power in the vicinity of the optical axis. This configuration is advantageous from the viewpoint of shortening the total length of the lens. It is preferable for the fourth lens L4 to be a meniscus lens in the vicinity of the optical axis. In this case, correction of astigmatism will be facilitated. Correction of astigmatism will be facilitated further in the case that the fourth lens L4 is a meniscus lens having a concave surface toward the object side.

The fifth lens L5 has a negative refractive power in the vicinity of the optical axis. This configuration is advantageous from the viewpoint of shortening the total length of the lens. In addition, the fifth lens L5 has a concave surface toward the object side in the vicinity of the optical axis. By configuring the fifth lens L5 to have a concave surface toward the object side in the vicinity of the optical axis, correction of astigmatism will be facilitated, and this configuration is also advantageous from the viewpoint of widening the angle of view. In addition, it is preferable for the fifth lens L5 to be a meniscus lens having a concave surface toward the object side in the vicinity of the optical axis. In this case, correction of astigmatism will be facilitated further.

The sixth lens L6 has a negative refractive power in the vicinity of the optical axis. This configuration is advantageous from the viewpoint of shortening the total length of the lens. In addition, sixth lens L6 has a concave surface toward the image side in the vicinity of the optical axis. By configuring the sixth lens L6 of the imaging lens L to have a concave surface toward the image side in the vicinity of the optical axis, a shortening of the total length of the lens can be favorably realized. In addition, it is preferable for the sixth lens L6 to be a meniscus lens having a concave surface toward the image side in the vicinity of the optical axis. This configuration is advantageous from the viewpoints of shortening the total length of the lens and correcting field curvature.

Further the surface of the sixth lens L6 toward the image side is of an aspherical shape which is concave in the vicinity of the optical axis and convex at the peripheral portion thereof. That is, the surface of the sixth lens L6 toward the image side is an aspherical shape having an inflection point within the effective diameter thereof. That the surface of the sixth lens L6 toward the image side has an "inflection point" means that there is a point at which a curve formed by the cross section of the surface of the sixth lens L6 toward the image side within the effective diameter that includes the optical axis Z1 changes from a convex shape to a concave shape (or from a concave shape to a convex shape). In addition, the peripheral portion here refers to a portion toward the exterior of 60% of the effective diameter in the radial direction. By configuring the surface of the sixth lens L6 toward the image side to be of an aspherical shape which is concave in the vicinity of the optical axis and convex at the peripheral portion thereof, increases in the incident angles of light rays that pass through the optical system and enter the image formation plane (imaging element) can be suppressed, particularly at peripheral portions of the imaging region. As a result, a decrease in the light receiving efficiency at the peripheral portions of the imaging region can be suppressed, while realizing a shortening of the total length of the lens.

The imaging lens L is capable of favorably shortening the total length of the lens and widening the angle of view, by the configurations of the first lens L1 having a positive refractive power and a convex surface toward the object side, the second lens L2 having a negative refractive power, the third lens L3, which is a meniscus lens having a positive refractive power and a convex surface toward the object side, and the fourth lens L4 having a positive refractive power, provided in this order from the object side. Further, the rearward principal point of the entire lens system can be positioned toward the object side, and the total length of the lens can be favorably shortened, by providing the fifth lens L5 and the sixth lens L6 having negative refractive powers adjacent to the fourth lens L4 toward the image side thereof.

It is preferable for at least one of the surfaces of each of the first lens L1 through the sixth lens L6 of the imaging lens L to be an aspherical surface, in order to improve performance.

In addition, it is preferable for the first lens L1 through the sixth lens L6 that constitute the imaging lens L to be single lenses, not cemented lenses. In this case, the number of lens surfaces will be greater than that for a case in which any of the first lens L1 through the sixth lens L6 is a cemented lens, and thereby an increase in the number of aspherical surfaces becomes possible. Therefore, the degree of freedom in the design of each lens will increase. As a result, a shortening of the total length can be favorably achieved.

In addition, in the case that the configurations of each of the first lens L1 through the sixth lens L6 are set such that the full angle of view is 60 degrees or greater as in the example illustrated in FIG. 7, the imaging lens L may be favorably applied to cellular telephone terminals and the like, which are often used for close distance photography.

Next, the operation and effects related to conditional formulae to be satisfied by the imaging lens L configured as described above will be described.

First, the imaging lens L satisfies Conditional Formula (1) below.

$$1.54 < f/f4 < 3 \tag{1}$$

wherein f is the focal length of the entire lens system, and f4 is the focal length of the fourth lens.

It is preferable for one or arbitrary combinations of the conditional formulae below to be satisfied in the imaging lens L. It is preferable for the conditional formulae to be satisfied to be selected according to items required of the imaging lens L.

$$0.5 < f/f1 < 1 \tag{2}$$

$$-0.3 < f/f23456 < 0.4 \tag{3}$$

$$-0.7 < (R1f - R1r)/(R1f + R1r) < 0 \tag{4}$$

wherein f is the focal length of the entire lens system, f1 is the focal length of the first lens, f23456 is the combined focal length of the second lens through the sixth lens, R1f is the paraxial radius of curvature of the surface of the first lens toward the object side, and R1r is the paraxial radius of curvature of the surface of the first lens toward the image side.

Hereinafter, the operation and effects of the above conditional formulae will be described.

Conditional Formula (1) defines a preferable range of numerical values for the focal length f of the entire lens system with respect to the focal length f4 of the fourth lens L4. By securing the refractive power of the fourth lens L4 such that the value of f/f4 is not less than or equal to the lower limit defined in Conditional Formula (1), a shortening of the total length of the lens can be favorably realized. By suppressing the refractive power of the fourth lens L4 such that the value of f/f4 is not greater than or equal to the upper limit defined in Conditional Formula (1), spherical aberration can be favorably corrected.

By configuring the imaging lens such that Conditional Formula (1) is satisfied, spherical aberration can be favorably corrected, while the length of the entire lens system can be favorably shortened. It is more preferable for Conditional Formula (1-1) to be satisfied, and even more preferable for Conditional Formula (1-2) to be satisfied, in order to cause these advantageous effects to become more prominent.

$$1.55<f/f4<2.5 \tag{1-1}$$

$$1.55<f/f4<2.2 \tag{1-2}$$

Conditional Formula (2) defines a preferable range of numerical values for the ratio of the focal length f of the entire lens system with respect to the focal length f1 of the first lens L1. By securing the refractive power of the first lens L1 such that the value of f/f1 is not less than or equal to the lower limit defined in Conditional Formula (2), a shortening of the total length of the lens can be favorably realized. By suppressing the refractive power of the first lens L1 such that the value of f/f1 is not greater than or equal to the upper limit defined in Conditional Formula (2), spherical aberration and astigmatism at low angles of view can be favorably corrected.

By configuring the imaging lens such that Conditional Formula (2) is satisfied, spherical aberration and astigmatism at low angles of view can be favorably corrected, while the length of the entire lens system can be shortened. It is more preferable for Conditional Formula (2-1) to be satisfied, and even more preferable for Conditional Formula (2-2) to be satisfied, in order to cause these advantageous effects to become more prominent.

$$0.6<f/f1<0.95 \tag{2-1}$$

$$0.65<f/f1<0.9 \tag{2-2}$$

Conditional Formula (3) defines a preferable range of numerical values for the ratio of the focal length f of the entire lens system with respect to the combined focal length of the second lens L2 through the sixth lens L6. That is, Conditional Formula (3) defines a preferable range of numerical values for the ratio of the refractive power of a combined optical system constituted by combining the lenses other than the first lens L1 with respect to the refractive power of the entire lens system. By setting the refractive power of the combined optical system that excludes the first lens L1 such that the value of f/f23456 is not less than or equal to the lower limit defined in Conditional Formula (3), astigmatism can be favorably corrected, and this configuration is also advantageous from the viewpoint of widening the angle of view. Setting the refractive power of the combined optical system that excludes the first lens L1 such that the value of f/f23456 is not greater than or equal to the upper limit defined in Conditional Formula (3) is advantageous from the viewpoint of shortening the total length of the lens.

By configuring the imaging lens such that Conditional Formula (3) is satisfied, astigmatism can be favorably corrected and a widening of the angle of view can be achieved, while the length of the entire lens system can be shortened. It is more preferable for Conditional Formula (3-1) to be satisfied, and even more preferable for Conditional Formula (3-2) to be satisfied, in order to cause these advantageous effects to become more prominent.

$$-0.2<f/f23456<0.3 \tag{3-1}$$

$$-0.15<f/f23456<0.25 \tag{3-2}$$

Conditional Formula (4) defines a preferable range of numerical values related to the paraxial radius of curvature R1f of the surface of the first lens L1 toward the object side and the paraxial radius of curvature R1r of the surface of the first lens L1 toward the image side. By setting the paraxial radius of curvature of the surface of the first lens L1 toward the object side and the paraxial radius of curvature of the surface of the first lens L1 toward the image side such that the value of (R1f−R1r)/(R1f+R1r) is not less than or equal to the lower limit defined in Conditional Formula (4), the radius of curvature of the surface of the first lens L1 toward the image side can be prevented from becoming excessively small with respect to the radius of curvature of the surface of the first lens L1 toward the object side. This configuration is advantageous from the viewpoint of shortening the total length of the lens. By setting the paraxial radius of curvature of the surface of the first lens L1 toward the object side and the paraxial radius of curvature of the surface of the first lens L1 toward the image side such that the value of (R1f−R1r)/(R1f+R1r) is not greater than or equal to the upper limit defined in Conditional Formula (4), the radius of curvature of the surface of the first lens L1 toward the image side can be prevented from becoming excessively great with respect to the radius of curvature of the surface of the first lens L1 toward the object side. As a result, spherical aberration and astigmatism can be favorably corrected.

By configuring the imaging lens such that Conditional Formula (4) is satisfied, spherical aberration and astigmatism can be favorably corrected, while the total length of the lens can be favorably shortened. It is more preferable for Conditional Formula (4-1) to be satisfied, and even more preferable for Conditional Formula (4-2) to be satisfied, in order to cause these advantageous effects to become more prominent.

$$-0.65<(R1f-R1r)/(R1f+R1r)<-0.1 \tag{4-1}$$

$$-0.62<(R1f-R1r)/(R1f+R1r)<-0.2 \tag{4-2}$$

Next, specific examples of numerical values of the imaging lens of the present disclosure will be described. A plurality of examples of numerical values will be summarized and explained below.

Table 1 and Table 2 below show specific lens data corresponding to the configuration of the imaging lens illustrated in FIG. 1. Table 1 shows basic lens data of the imaging lens, and Table 2 shows data related to aspherical surfaces. In the lens data of Table 1, ith surface numbers that sequentially increase from the object side to the image side, with the surface of the aperture stop St designated as first and the lens surface at the most object side (the surface of the first lens L1 toward the object side) designated as second, are shown in the column Si for the imaging lens of Example 1. The radii of curvature (mm) of ith surfaces from the object side corresponding to the symbols Ri illustrated in FIG. 1 are shown in the column Ri. Similarly, the distances (mm) between an ith surface Si and an i+1st surface Si+1 from the object side along the optical axis Z are shown in the column Di. The refractive indices of jth optical elements from the object side with respect to the d line (wavelength: 587.6 nm) are shown in the column Ndj. The Abbe's numbers of the jth optical elements with respect to the d line are shown in the column vdj. Note that the signs of the radii of curvature are positive in cases that the surface shape is convex toward the object side, and negative in cases that the surface shape is convex toward the image side.

Note that the focal length f of the entire lens system (mm), the back focus Bf (mm), the F number Fno, the full angle of view 2ω(°), and the total length TL of the lens system are shown as various items of data above the frame of Table 1. Note that the back focus Bf is represented as an air converted value. The total length TL of the lens system is the distance along the optical axis from the surface of the first lens L1 toward the object side to the imaging surface, in which the portion corresponding to the back focus Bf is an air converted value.

In the imaging lens of Example 1, both of the surfaces of the first lens L1 through the sixth lens L6 are all aspherical in shape. In the basic lens data of Table 1, numerical values of radii of curvature in the vicinity of the optical axis (paraxial radii of curvature) are shown as the radii of curvature of the aspherical surfaces.

Table 2 shows aspherical surface data of the imaging lens of Example 1. In the numerical values shown as the aspherical surface data, the symbol "E" indicates that the numerical value following thereafter is a "power index" having 10 as a base, and that the numerical value represented by the index function having 10 as a base is to be multiplied by the numerical value in front of "E". For example, "1.0E−02" indicates that the numerical value is "$1.0 \cdot 10^{-2}$".

The values of coefficients An and K represented by the aspherical surface shape formula (A) below are shown as the aspherical surface data. In greater detail, Z is the length (mm) of a normal line that extends from a point on the aspherical surface having a height h to a plane perpendicular to the optical axis that contacts the apex of the aspherical surface.

$$Z = C \cdot h^2 / \{1 + (1 - K \cdot C^2 \cdot h^2)^{1/2}\} + \Sigma An \cdot h^n \quad (A)$$

wherein Z is the depth of the aspherical surface (mm), h is the distance from the optical axis to the surface of the lens (height) (mm), C is the paraxial curvature=1/R (R is the paraxial radius of curvature), An is an nth ordinal aspherical surface coefficient (n is an integer 3 or greater), and K is an aspherical surface coefficient.

Figure 2:
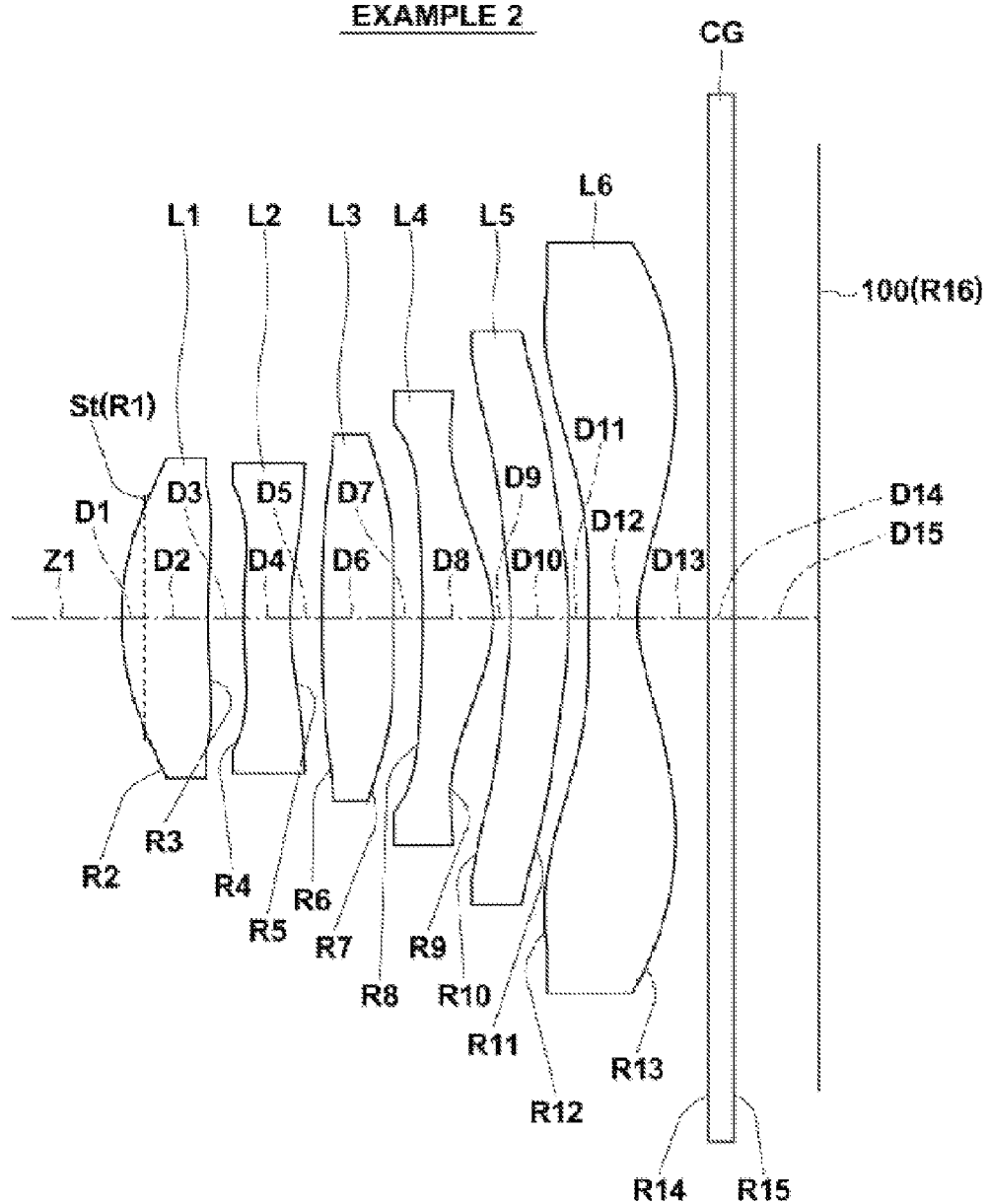
FIG. 2 is a sectional diagram that illustrates a second example of the configuration of an imaging lens according to an embodiment of the present disclosure, and corresponds to a lens of Example 2.
Figure 3:
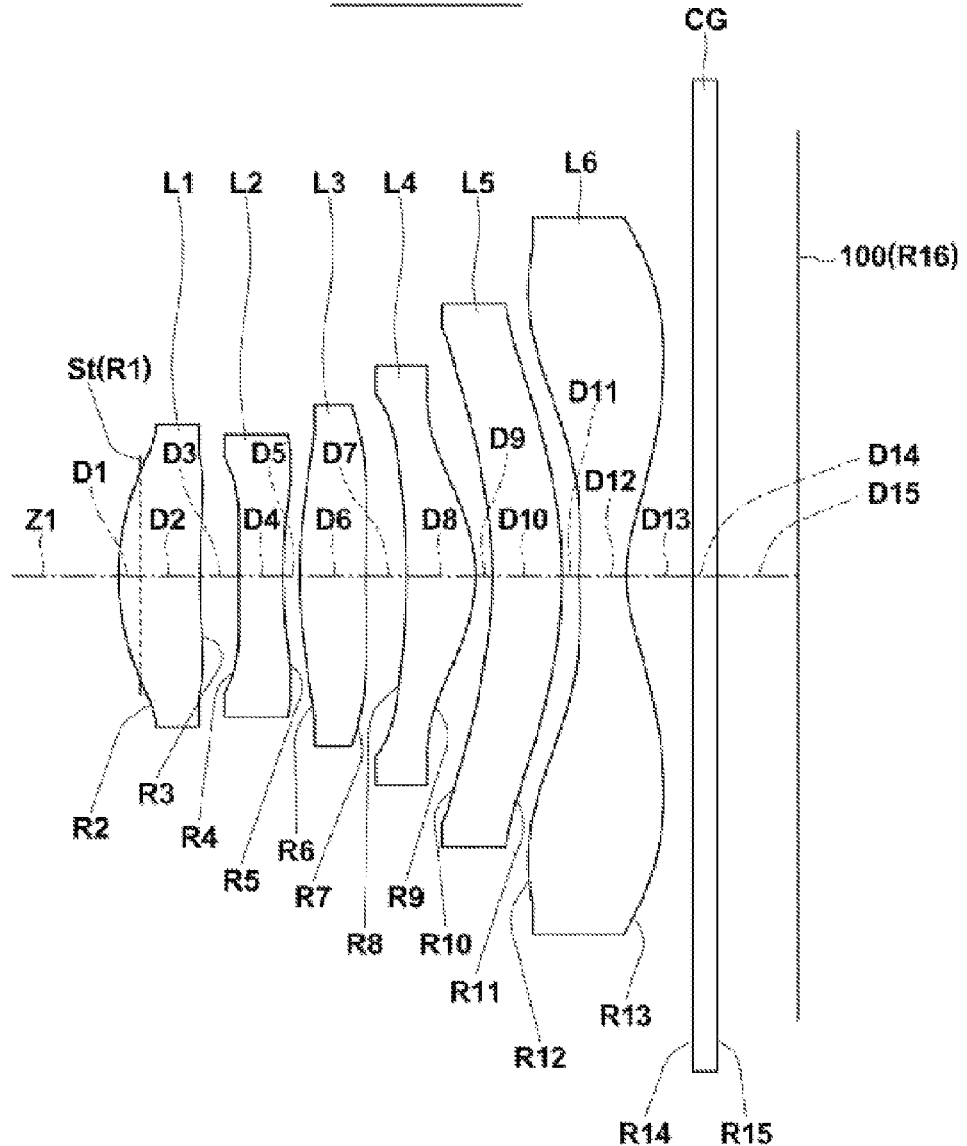
FIG. 3 is a sectional diagram that illustrates a third example of the configuration of an imaging lens according to an embodiment of the present disclosure, and corresponds to a lens of Example 3.
Figure 4:
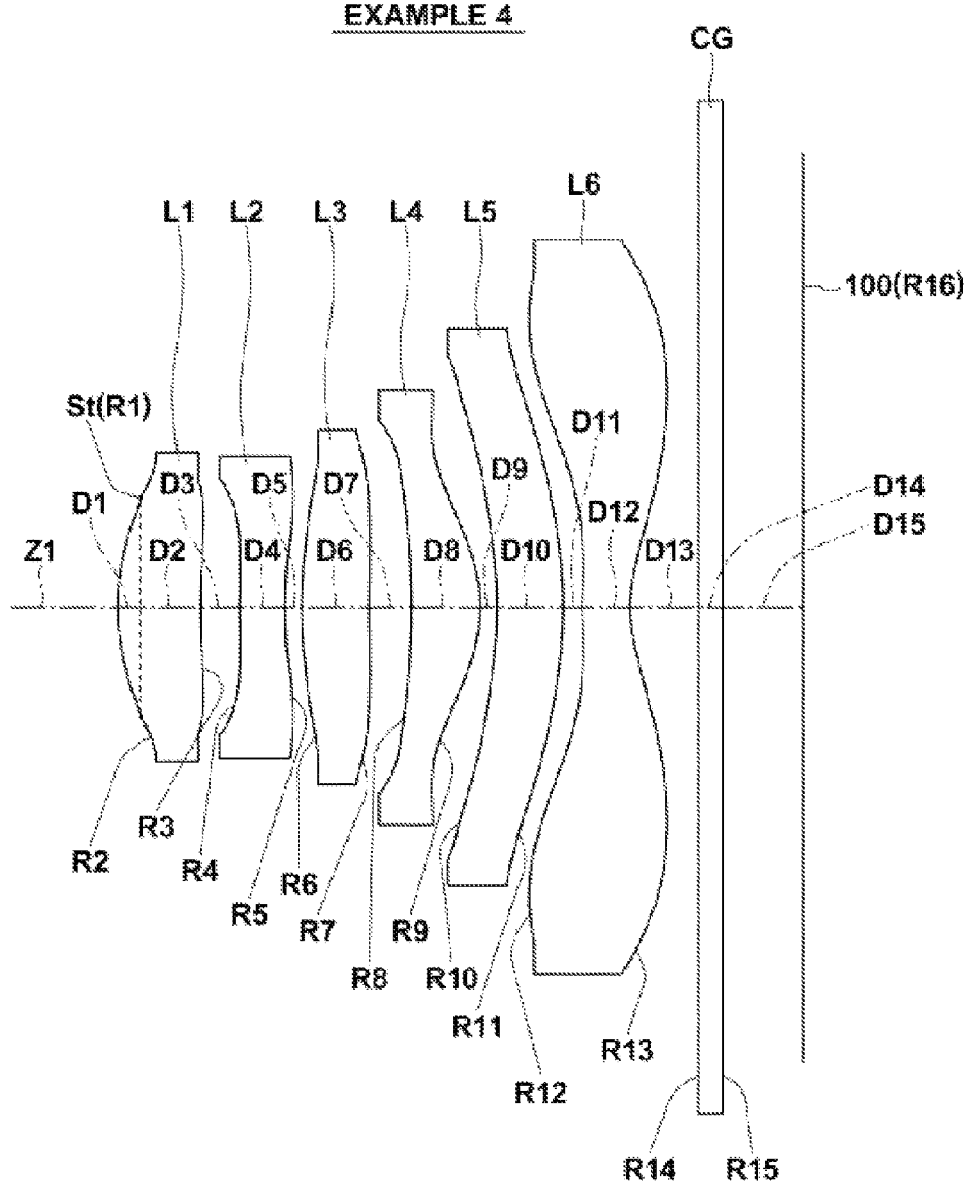
FIG. 4 is a sectional diagram that illustrates a fourth example of the configuration of an imaging lens according to an embodiment of the present disclosure, and corresponds to a lens of Example 4.
Figure 5:
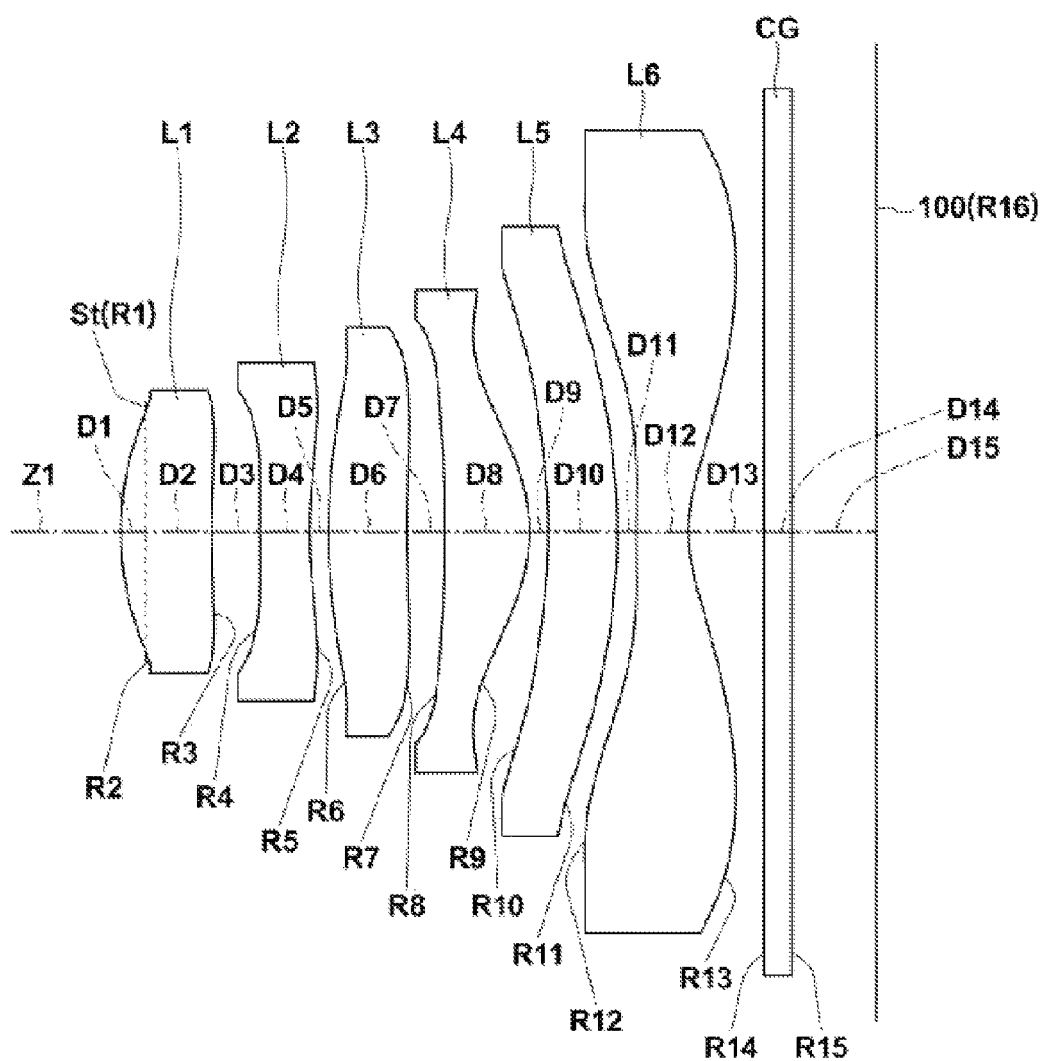
FIG. 5 is a sectional diagram that illustrates a fifth example of the configuration of an imaging lens according to an embodiment of the present disclosure, and corresponds to a lens of Example 5.
Figure 6:
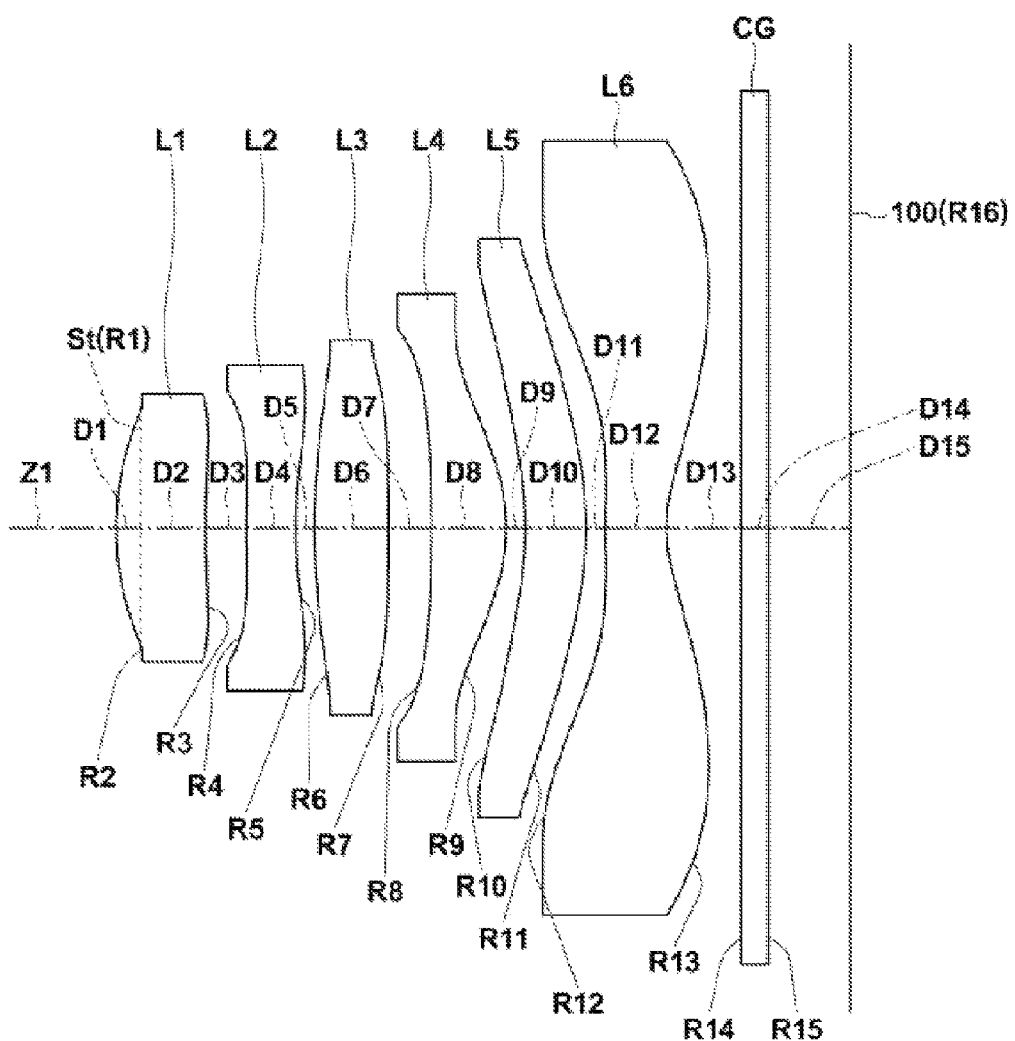
FIG. 6 is a sectional diagram that illustrates a sixth example of the configuration of an imaging lens according to an embodiment of the present disclosure, and corresponds to a lens of Example 6.

Specific lens data corresponding to the configuration of the imaging lens illustrated in FIG. 2 are shown in Table 3 and Table 4 as Example 2 in the same manner as that for the imaging lens of Example 1. Similarly, specific lens data corresponding to the configurations of the imaging lenses illustrated in FIG. 3 through FIG. 6 are shown in Table 5 through Table 12 as Example 3 through Example 6. In the imaging lenses of Example 1 through Example 6, both of the surfaces of the first lens L1 through the sixth lens L6 are all aspherical surfaces.

Figure 8:
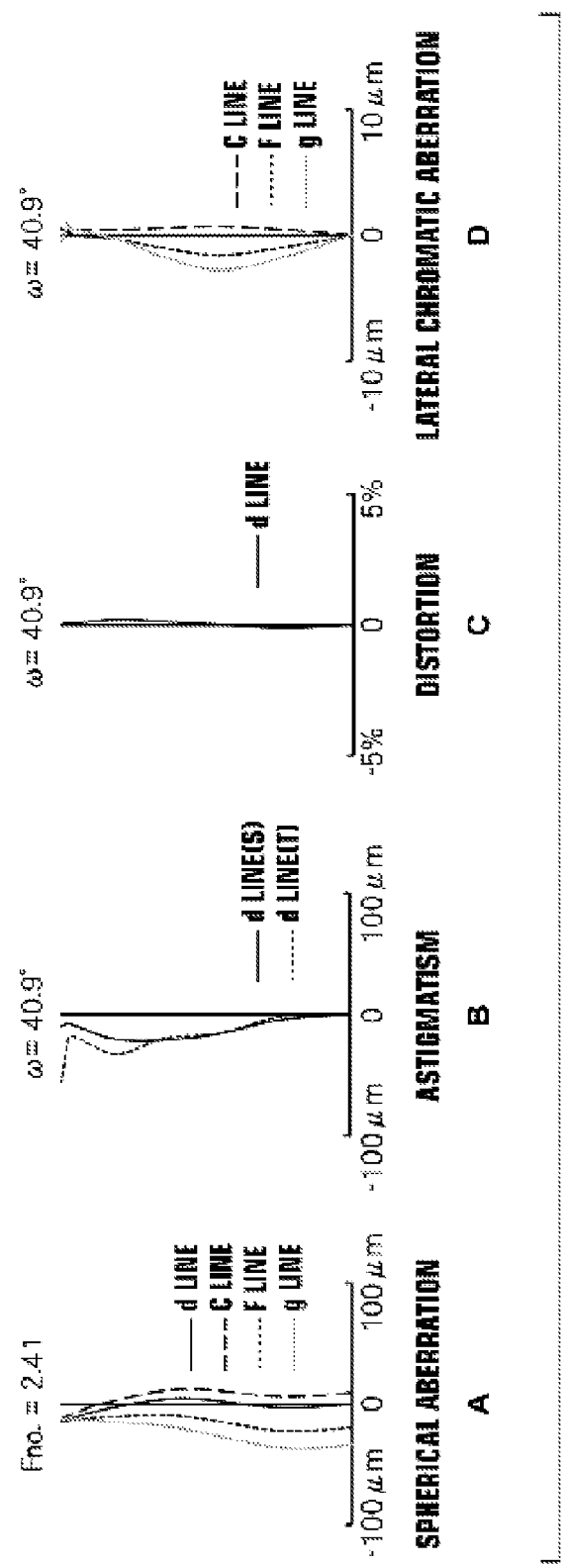
FIG. 8 is a collection of diagrams that illustrate aberrations of the imaging lens of Example 1, wherein A illustrates spherical aberration, B illustrates astigmatism, C illustrates distortion, and D illustrates lateral chromatic aberration.

A through D of FIG. 8 are a collection of diagrams that illustrate aberrations of the imaging lens of Example 1, wherein the diagrams illustrate the spherical aberration, the astigmatism, the distortion, and the lateral chromatic aberration (chromatic aberration of magnification) of the imaging lens of Example 1, respectively. Each of the diagrams that illustrate the spherical aberration, the astigmatism (field curvature), and the distortion illustrate aberrations using the d line (wavelength: 587.6 nm) as a reference wavelength. The diagrams that illustrate spherical aberration and lateral chromatic aberration also show aberrations related to the F line (wavelength: 486.1 nm), the C line (wavelength: 656.3 nm) and the g line (wavelength: 435.83 nm). In the diagram that illustrates astigmatism, aberration in the sagittal direction (S) is indicated by a solid line, while aberration in the tangential direction (T) is indicated by a broken line. In addition, "Fno." denotes F numbers, and "ω" denotes a half value of the maximum angle of view in a state focused on an object at infinity.

Figure 9:
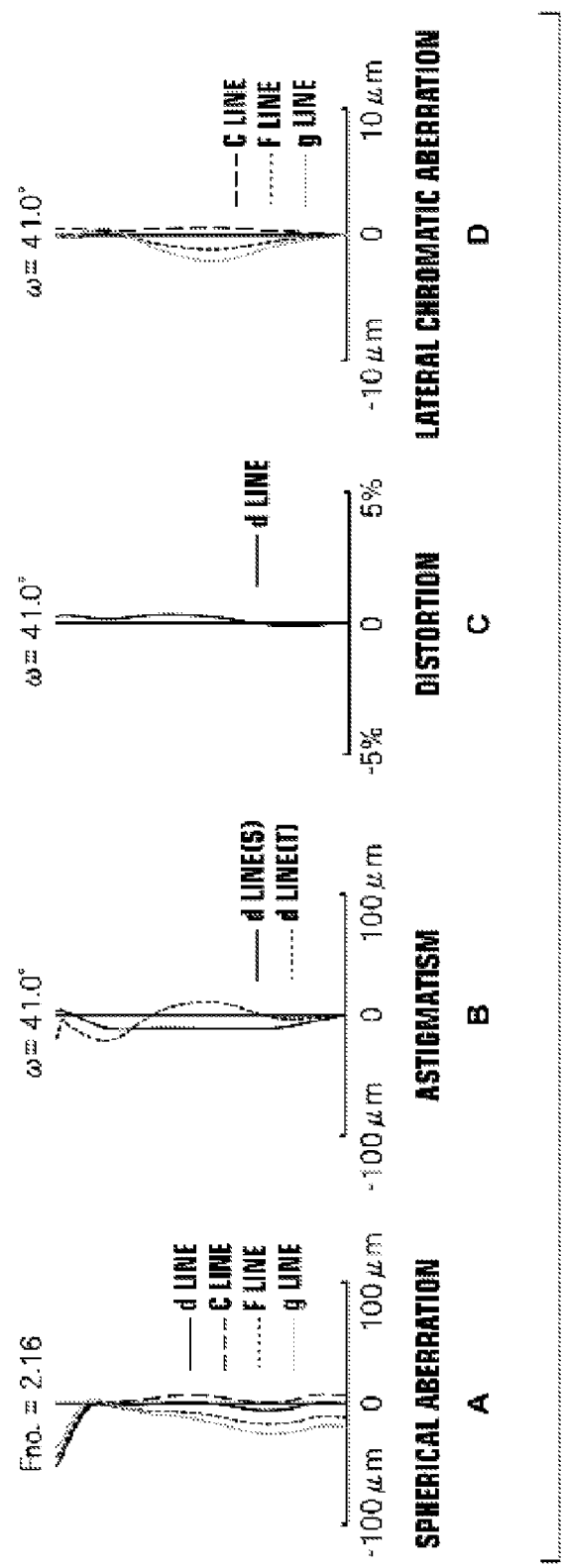
FIG. 9 is a collection of diagrams that illustrate aberrations of the imaging lens of Example 2, wherein A illustrates spherical aberration, B illustrates astigmatism, C illustrates distortion, and D illustrates lateral chromatic aberration.
Figure 10:
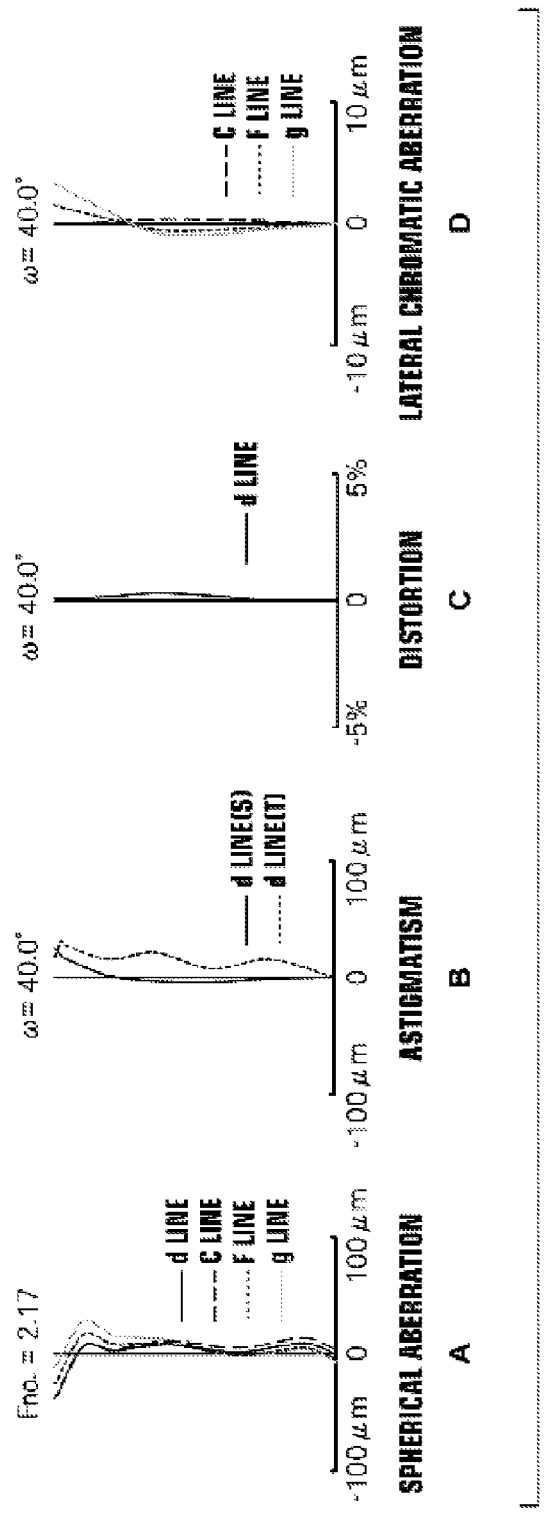
FIG. 10 is a collection of diagrams that illustrate aberrations of the imaging lens of Example 3, wherein A illustrates spherical aberration, B illustrates astigmatism, C illustrates distortion, and D illustrates lateral chromatic aberration.
Figure 11:
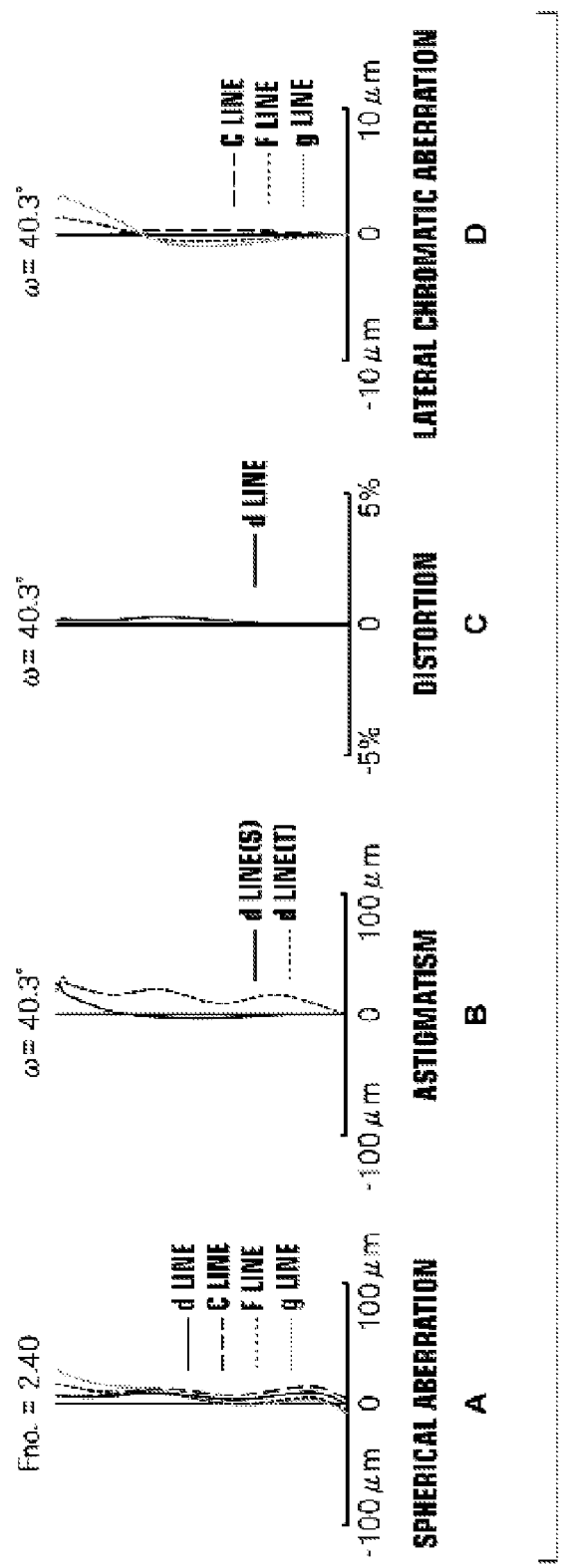
FIG. 11 is a collection of diagrams that illustrate aberrations of the imaging lens of Example 4, wherein A illustrates spherical aberration, B illustrates astigmatism, C illustrates distortion, and D illustrates lateral chromatic aberration.
Figure 12:
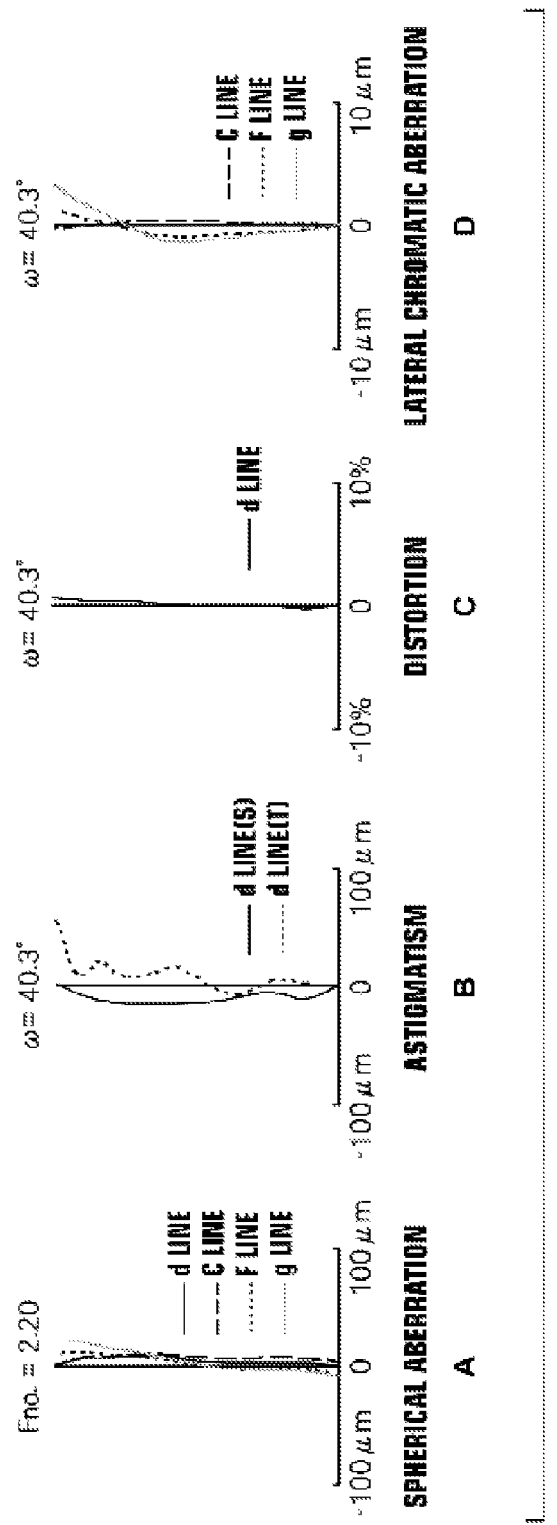
FIG. 12 is a collection of diagrams that illustrate aberrations of the imaging lens of Example 5, A illustrates spherical aberration, B illustrates astigmatism, C illustrates distortion, and D illustrates lateral chromatic aberration.
Figure 13:
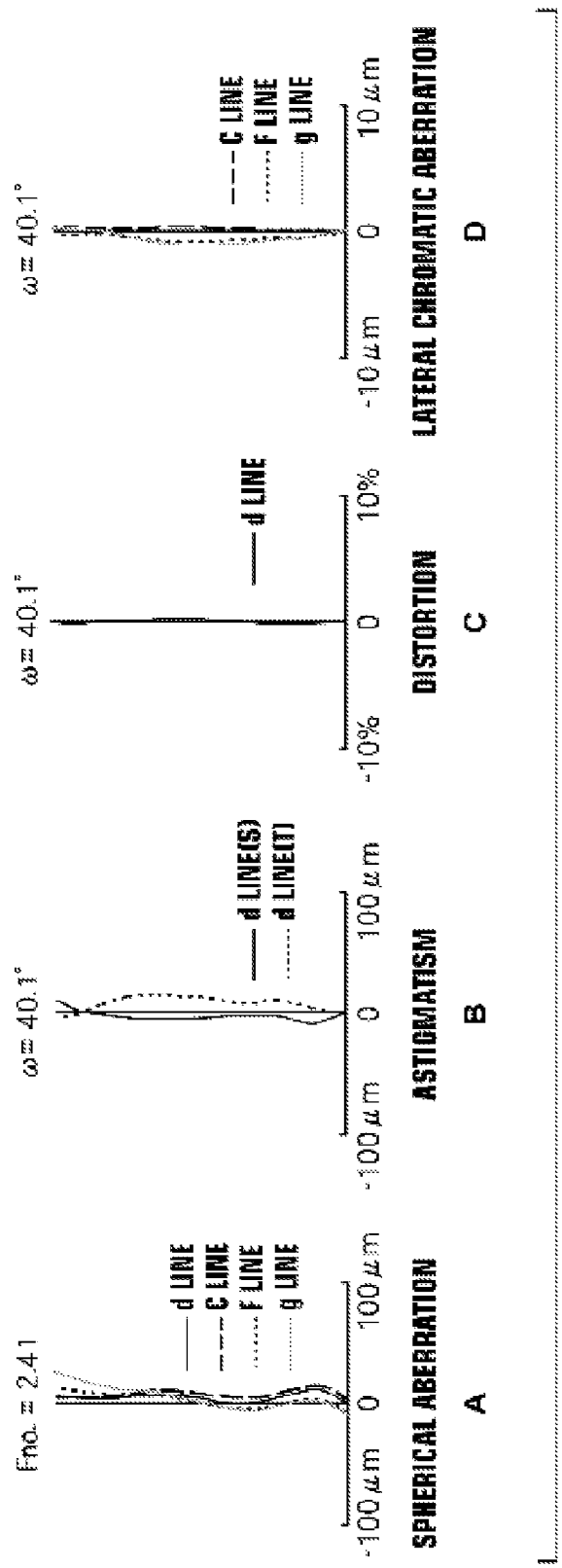
FIG. 13 is a collection of diagrams that illustrate aberrations of the imaging lens of Example 6, wherein A illustrates spherical aberration, B illustrates astigmatism, C illustrates distortion, and D illustrates lateral chromatic aberration.

Similarly, the aberrations of the imaging lens of Example 2 through Example 6 are illustrated in A through D of FIG. 9 through A through D of FIG. 13. The diagrams that illustrate aberrations of A through D of FIG. 8 through A through D of FIG. 13 are all for cases in which the object distance is infinity.

Table 13 shows values corresponding to Conditional Formulae (1) through (4), respectively summarized for each of Examples 1 through 6.

As can be understood from each set of numerical value data and from the diagrams that illustrate aberrations, the imaging lenses of Examples 1 through 6 have wide angles of view of 80 degrees or greater and ratios TL/f of the total length TL of the lens and the focal length f of the entire lens system within a range from 1.27 to 1.31. That is, the imaging lenses of Examples 1 through 6 realize a shortening of the total length of the lens while favorably correcting various aberrations to realize high imaging performance.

Note that the imaging lens of the present disclosure is not limited to the embodiments and Examples described above, and various modifications are possible. For example, the values of the radii of curvature, the distances among surfaces, the refractive indices, the Abbe's numbers, the aspherical surface coefficients, etc., are not limited to the numerical values indicated in connection with the Examples of numerical values, and may be other values.

In addition, the Examples are described under the presumption that they are to be utilized with fixed focus. However, it is also possible for configurations capable of adjusting focus to be adopted. It is possible to adopt a configuration, in which the entirety of the lens system is fed out or a portion of the lenses is moved along the optical axis to enable automatic focus, for example.

TABLE 1

Example 1
f = 3.054, Bf = 0.995, Fno. = 2.41, 2ω = 81.8, TL = 3.881

| Si | Ri | Di | Ndj | vdj |
|---|---|---|---|---|
| 1 (aperture stop) | ∞ | −0.109 | | |
| *2 | 1.48851 | 0.481 | 1.54492 | 55.89 |
| *3 | 3.39432 | 0.189 | | |
| *4 | 2.39108 | 0.262 | 1.63351 | 23.63 |
| *5 | 1.67779 | 0.178 | | |
| *6 | 5.64713 | 0.395 | 1.54492 | 55.89 |
| *7 | 8.54563 | 0.169 | | |
| *8 | −14.70415 | 0.400 | 1.54492 | 55.89 |
| *9 | −0.83298 | 0.100 | | |
| *10 | −2.22716 | 0.325 | 1.63351 | 23.63 |
| *11 | −2.42944 | 0.112 | | |
| *12 | −32.65383 | 0.275 | 1.54492 | 55.89 |
| *13 | 0.92208 | 0.400 | | |
| 14 | ∞ | 0.145 | 1.51633 | 64.14 |
| 15 | ∞ | 0.499 | | |
| 16 (imaging surface) | ∞ | | | |

*aspherical surface

TABLE 2

Example 1

| Surface Number | 2 | 3 | 4 | 5 |
|---|---|---|---|---|
| KA | −6.2346485E−01 | −2.6172858E+00 | 6.8114850E+00 | −2.7665192E+01 |
| A3 | −1.2307959E−02 | −1.0788950E−02 | 4.2859127E−02 | 6.6559934E−02 |
| A4 | 9.3315008E−02 | −2.2417532E−01 | −8.8181817E−01 | −8.3760630E−02 |
| A5 | −1.4942742E−01 | 4.6279801E−01 | 1.6328721E+00 | 2.3719014E+00 |
| A6 | 3.7131897E−01 | −1.2045159E+00 | −3.8535568E+00 | −1.0628656E+01 |
| A7 | −4.8596469E−01 | 9.7831456E−01 | 4.0760826E+00 | 1.9908455E+01 |
| A8 | 3.2008593E−01 | 3.3120997E−01 | −2.6512212E+00 | −2.0436752E+01 |
| A9 | −1.9990218E−01 | −8.8537235E−01 | 1.6578776E+00 | 1.1635578E+01 |
| A10 | 8.4168591E−02 | 3.1378939E−01 | −4.1656627E−01 | −2.8502725E+00 |

| Surface Number | 6 | 7 | 8 | 9 |
|---|---|---|---|---|
| KA | 3.9389929E+00 | 3.3248187E+01 | −8.6027486E+00 | −2.6910056E+00 |
| A3 | −3.4157587E−02 | −7.4744334E−02 | 1.8268020E−02 | 1.5052835E−01 |
| A4 | 2.7037317E−01 | 4.2071241E−01 | −1.2878481E−01 | −4.2518864E−02 |
| A5 | −1.7483469E+00 | −3.0741293E+00 | 3.8218464E−01 | −5.5875708E−01 |
| A6 | 3.7590628E+00 | 7.4344630E+00 | −6.4630278E−01 | 2.0624960E+00 |
| A7 | −1.0881619E+00 | −1.0532994E+01 | 4.7290273E−01 | −3.4304983E+00 |
| A8 | −5.6019946E+00 | 9.1600320E+00 | −1.2250340E−01 | 3.4178769E+00 |
| A9 | 6.9320804E+00 | −4.5468708E+00 | −1.3122944E−01 | −1.8533026E+00 |
| A10 | −2.5052533E+00 | 1.0192941E+00 | 7.8925890E−02 | 4.0172121E−01 |

| Surface Number | 10 | 11 | 12 | 13 |
|---|---|---|---|---|
| KA | −5.5998956E+00 | −1.4125479E+01 | 9.0340852E+00 | −4.9846651E+00 |
| A3 | 2.5756464E−01 | 1.5894913E−01 | −6.7808646E−02 | −1.3179047E−01 |
| A4 | 7.0186630E−02 | −7.1988189E−02 | −2.5437722E−02 | −8.1475897E−02 |
| A5 | −3.8390564E−01 | −1.1788154E−01 | 3.3050373E−01 | 2.5315519E−01 |
| A6 | −1.9775822E−03 | 6.3492697E−02 | −7.9359956E−02 | −2.1982150E−01 |
| A7 | 1.4513416E−01 | 2.7371630E−03 | −5.6320755E−02 | 6.2033406E−02 |
| A8 | −4.8811676E−03 | 4.5987453E−03 | 3.6818926E−02 | 2.4349267E−02 |
| A9 | 1.5207812E−02 | −3.0755726E−03 | −6.3771971E−03 | −2.0390224E−02 |
| A10 | −1.8986309E−02 | −1.6257539E−04 | 4.9105600E−05 | 3.7795065E−03 |

TABLE 3

Example 2
f = 3.034, Bf = 0.973, Fno. = 2.16, 2ω = 82.0, TL = 3.879

| Si | Ri | Di | Ndj | νdj |
|---|---|---|---|---|
| 1 (aperture stop) | ∞ | −0.129 | | |
| *2 | 1.51385 | 0.489 | 1.54492 | 55.89 |
| *3 | 4.28784 | 0.201 | | |
| *4 | 3.04013 | 0.263 | 1.63351 | 23.63 |
| *5 | 1.85241 | 0.176 | | |
| *6 | 7.31246 | 0.401 | 1.54492 | 55.89 |
| *7 | 22.23331 | 0.165 | | |
| *8 | −10.98351 | 0.400 | 1.54492 | 55.89 |
| *9 | −0.74798 | 0.100 | | |
| *10 | −1.43253 | 0.325 | 1.63351 | 23.63 |
| *11 | −2.01251 | 0.111 | | |
| *12 | 6.61021 | 0.275 | 1.54492 | 55.89 |
| *13 | 0.79041 | 0.400 | | |
| 14 | ∞ | 0.145 | 1.51633 | 64.14 |
| 15 | ∞ | 0.477 | | |
| 16 (imaging surface) | ∞ | | | |

*aspherical surface

TABLE 4

Example 2

| Surface Number | 2 | 3 | 4 | 5 |
|---|---|---|---|---|
| KA | −6.3768363E−01 | −3.6515188E+00 | 6.9084607E+00 | −2.8897945E+01 |
| A3 | −3.6678849E−02 | −3.9909150E−03 | 3.5653426E−02 | 2.8717163E−02 |
| A4 | 3.0835437E−01 | −2.2288258E−01 | −8.2769129E−01 | −2.9280863E−02 |
| A5 | −9.4749695E−01 | 4.2646045E−01 | 1.5121944E+00 | 1.6049743E+00 |
| A6 | 1.8218543E+00 | −1.3480768E+00 | −3.5074036E+00 | −7.2952907E+00 |
| A7 | −2.1746590E+00 | 1.5813259E+00 | 3.8863977E+00 | 1.3018856E+01 |
| A8 | 2.3521836E+00 | −1.9517361E−01 | −2.9150404E+00 | −1.2457391E+01 |
| A9 | −2.5523740E+00 | −1.4670050E+00 | 1.5821644E+00 | 6.5281496E+00 |
| A10 | 1.2506477E+00 | 9.5962275E−01 | 2.9378747E−03 | −1.4321174E+00 |

| Surface Number | 6 | 7 | 8 | 9 |
|---|---|---|---|---|
| KA | −2.7320533E+01 | −8.3349660E+00 | 2.7024535E+01 | −2.6322193E+00 |
| A3 | −5.7459708E−02 | −1.1289481E−01 | 8.6398406E−03 | 1.3385304E−01 |
| A4 | 3.8904410E−01 | 6.1174362E−01 | −1.5016525E−01 | −3.1325016E−02 |

TABLE 4-continued

Example 2

| | | | | |
|---|---|---|---|---|
| A5 | −1.8537498E+00 | −3.4422668E+00 | 4.3408801E−01 | −4.5627655E−01 |
| A6 | 3.5499103E+00 | 8.3994020E+00 | −4.3828327E−01 | 1.8423968E+00 |
| A7 | −7.1577856E−01 | −1.2365894E+01 | 1.6107714E−01 | −3.0898692E+00 |
| A8 | −5.4450841E+00 | 1.1084286E+01 | −6.3686023E−02 | 2.9980463E+00 |
| A9 | 6.3294833E+00 | −5.6078553E+00 | −4.1192953E−02 | −1.5781508E+00 |
| A10 | −2.1927643E+00 | 1.2783382E+00 | 3.9274039E−02 | 3.3405388E−01 |

| Surface Number | 10 | 11 | 12 | 13 |
|---|---|---|---|---|
| KA | −6.5075494E+00 | −1.2123974E+01 | −1.3379446E+01 | −4.2720944E+00 |
| A3 | 2.7507054E−01 | 1.0817988E−01 | −2.1874127E−01 | −1.7967109E−01 |
| A4 | 9.4206971E−02 | −5.8975439E−02 | −2.4604774E−01 | −1.9410309E−02 |
| A5 | −3.8630138E−01 | −3.3562334E−03 | 3.8676516E−01 | 1.6597318E−01 |
| A6 | 3.7037260E−04 | 3.9388944E−02 | −8.3764369E−02 | −1.3679023E−01 |
| A7 | 1.3897427E−01 | −7.4882781E−02 | −6.5929100E−02 | 3.1227258E−02 |
| A8 | −1.2695310E−02 | 3.2943744E−02 | 3.7459973E−02 | 1.5417515E−02 |
| A9 | 1.3631137E−02 | 5.7401815E−03 | −5.7677694E−03 | −1.0178048E−02 |
| A10 | −1.5111878E−02 | −3.8255889E−03 | 2.2141173E−05 | 1.6498232E−03 |

TABLE 5

Example 3
f = 3.141, Bf = 0.977, Fno. = 2.17, 2ω = 80.0, TL = 3.997

| Si | Ri | Di | Ndj | νdj |
|---|---|---|---|---|
| 1 (aperture stop) | ∞ | −0.129 | | |
| *2 | 1.48833 | 0.487 | 1.54492 | 55.89 |
| *3 | 4.94686 | 0.230 | | |
| *4 | 9.48752 | 0.262 | 1.63351 | 23.63 |
| *5 | 2.22265 | 0.100 | | |
| *6 | 2.73360 | 0.394 | 1.54492 | 55.89 |
| *7 | 10.32230 | 0.242 | | |
| *8 | −5.56426 | 0.412 | 1.54492 | 55.89 |
| *9 | −0.93148 | 0.100 | | |
| *10 | −2.56865 | 0.416 | 1.63351 | 23.63 |
| *11 | −2.77281 | 0.100 | | |
| *12 | 3.50256 | 0.277 | 1.54492 | 55.89 |
| *13 | 0.76788 | 0.400 | | |
| 14 | ∞ | 0.145 | 1.51633 | 64.14 |
| 15 | ∞ | 0.482 | | |
| 16 (imaging surface) | ∞ | | | |

*aspherical surface

TABLE 6

Example 3

| Surface Number | 2 | 3 | 4 | 5 |
|---|---|---|---|---|
| KA | −6.8257158E−01 | 5.9306869E+00 | 3.1860734E+00 | −4.3464563E+01 |
| A3 | −3.2195554E−02 | 2.3646292E−02 | 2.7303158E−02 | 4.0796052E−02 |
| A4 | 2.3384061E−01 | −3.9104220E−01 | −7.0830188E−01 | −3.5465782E−01 |
| A5 | −5.4227796E−01 | 1.1377927E+00 | 1.4777689E+00 | 2.2656166E+00 |
| A6 | 1.3543725E+00 | −2.3349203E+00 | −4.2624399E+00 | −8.2905427E+00 |
| A7 | −3.0713466E+00 | 1.4698015E+00 | 7.0274707E+00 | 1.5422080E+01 |
| A8 | 4.5793308E+00 | 1.0524741E+00 | −6.0825041E+00 | −1.6200867E+01 |
| A9 | −3.3716337E+00 | −2.0412804E+00 | 5.8602734E−01 | 8.8596831E+00 |
| A10 | 6.9025474E−01 | 5.6396366E−01 | 1.7628680E+00 | −1.8202624E+00 |

| Surface Number | 6 | 7 | 8 | 9 |
|---|---|---|---|---|
| KA | −1.6381588E+01 | −2.5488489E+01 | −3.7260327E+01 | −2.5839109E+00 |
| A3 | −7.8345386E−02 | −1.7731060E−01 | 2.2423059E−02 | −1.4137470E−01 |
| A4 | 3.2907950E−01 | 1.2865579E+00 | −4.1302562E−01 | 1.6266491E−01 |
| A5 | −1.0921537E+00 | −7.0576993E+00 | 6.9698079E−01 | −5.4998574E−01 |
| A6 | 1.8087664E+00 | 2.1283610E+01 | −2.2257419E−01 | 2.0770710E+00 |
| A7 | −3.5178441E−01 | −3.8378604E+01 | −8.2435076E−02 | −3.4241627E+00 |
| A8 | −2.4376710E+00 | 4.0864589E+01 | −1.1584125E−01 | 3.5039619E+00 |
| A9 | 2.6430564E+00 | −2.3807256E+01 | 1.6163226E−02 | −2.0282701E+00 |
| A10 | −8.7318318E−01 | 5.8592451E+00 | 3.7500877E−02 | 4.7225907E−01 |

| Surface Number | 10 | 11 | 12 | 13 |
|---|---|---|---|---|
| KA | −5.9830680E+00 | −5.0000009E+01 | −1.1486844E+01 | −4.0612259E+00 |
| A3 | −1.1335939E−01 | −1.1519417E−01 | −3.1337462E−01 | −1.6337009E−01 |
| A4 | 2.8060636E−01 | 4.1546693E−02 | −2.4526984E−01 | −8.5663178E−02 |
| A5 | 2.9339088E−02 | 1.6553685E−02 | 4.2310236E−01 | 2.2641286E−01 |
| A6 | −2.6905658E−01 | −1.5400149E−02 | −8.3722667E−02 | −1.3489630E−01 |

TABLE 6-continued

Example 3

| | | | | |
|---|---|---|---|---|
| A7 | −5.5886652E−02 | −7.5137309E−03 | −7.2547268E−02 | 1.2709219E−02 |
| A8 | 1.2845378E−01 | 1.0760256E−02 | 3.7571279E−02 | 1.8553809E−02 |
| A9 | 5.8728703E−02 | −7.8008349E−04 | −5.2873743E−03 | −8.3894149E−03 |
| A10 | −4.8419546E−02 | −7.3709948E−04 | 8.7599241E−07 | 1.1958322E−03 |

TABLE 7

Example 4
f = 3.105, Bf = 0.961, Fno. = 2.40, 2ω = 80.6, TL = 3.942

| Si | Ri | Di | Ndj | νdj |
|---|---|---|---|---|
| 1 (aperture stop) | ∞ | −0.129 | | |
| *2 | 1.48099 | 0.481 | 1.54492 | 55.89 |
| *3 | 4.94421 | 0.230 | | |
| *4 | 9.29797 | 0.262 | 1.63351 | 23.63 |
| *5 | 2.19497 | 0.100 | | |
| *6 | 2.66541 | 0.394 | 1.54492 | 55.89 |
| *7 | 9.54136 | 0.244 | | |
| *8 | −5.96433 | 0.400 | 1.54492 | 55.89 |
| *9 | −0.93455 | 0.100 | | |
| *10 | −2.59033 | 0.386 | 1.63351 | 23.63 |
| *11 | −2.75829 | 0.109 | | |
| *12 | 3.57397 | 0.275 | 1.54492 | 55.89 |
| *13 | 0.76071 | 0.400 | | |
| 14 | ∞ | 0.145 | 1.51633 | 64.14 |
| 15 | ∞ | 0.466 | | |
| 16 (imaging surface) | ∞ | | | |

*aspherical surface

TABLE 9

Example 5
f = 3.002, Bf = 0.942, Fno. = 2.20, 2ω = 80.6, TL = 3.944

| Si | Ri | Di | Ndj | νdj |
|---|---|---|---|---|
| 1 (aperture stop) | ∞ | −0.129 | | |
| *2 | 1.52994 | 0.481 | 1.54492 | 55.89 |
| *3 | 5.55305 | 0.254 | | |
| *4 | 11.00085 | 0.262 | 1.63351 | 23.63 |
| *5 | 2.36924 | 0.100 | | |
| *6 | 2.85627 | 0.416 | 1.54492 | 55.89 |
| *7 | 5.41383 | 0.199 | | |
| *8 | −19.04865 | 0.450 | 1.54492 | 55.89 |
| *9 | −0.90518 | 0.100 | | |
| *10 | −2.71159 | 0.365 | 1.63351 | 23.63 |
| *11 | −2.96668 | 0.100 | | |
| *12 | 4.52761 | 0.275 | 1.54492 | 55.89 |
| *13 | 0.78739 | 0.400 | | |
| 14 | ∞ | 0.145 | 1.51633 | 64.14 |
| 15 | ∞ | 0.447 | | |
| 16 (imaging surface) | ∞ | | | |

*aspherical surface

TABLE 8

Example 4

| Surface Number | 2 | 3 | 4 | 5 |
|---|---|---|---|---|
| KA | −6.8267210E−01 | 5.9323098E+00 | 2.4946575E+00 | −4.3070224E+01 |
| A3 | −3.0420014E−02 | 2.5420361E−02 | 2.8762921E−02 | 4.6235341E−02 |
| A4 | 2.2757069E−01 | −3.9399579E−01 | −7.1419203E−01 | −3.6060442E−01 |
| A5 | −5.3704539E−01 | 1.1397057E+00 | 1.4823769E+00 | 2.2994838E+00 |
| A6 | 1.3741545E+00 | −2.3521044E+00 | −4.2666602E+00 | −8.4585734E+00 |
| A7 | −3.1072808E+00 | 1.5059811E+00 | 7.0222458E+00 | 1.5817045E+01 |
| A8 | 4.5903344E+00 | 1.0583415E+00 | −6.0809649E+00 | −1.6687192E+01 |
| A9 | −3.3798052E+00 | −2.0930058E+00 | 6.1000250E−01 | 9.1450990E+00 |
| A10 | 7.0092364E−01 | 5.7676159E−01 | 1.7517826E+00 | −1.8754609E+00 |

| Surface Number | 6 | 7 | 8 | 9 |
|---|---|---|---|---|
| KA | −1.6395924E+01 | −2.8156019E+01 | −3.7630084E+01 | −2.5857888E+00 |
| A3 | −7.8594957E−02 | −1.8181767E−01 | 2.1928674E−02 | −1.3677978E−01 |
| A4 | 3.3618018E−01 | 1.3011575E+00 | −4.2278662E−01 | 1.6262346E−01 |
| A5 | −1.0874646E+00 | −7.1381386E+00 | 7.0833815E−01 | −5.4230016E−01 |
| A6 | 1.8062409E+00 | 2.1548138E+01 | −2.1403138E−01 | 2.0620909E+00 |
| A7 | −3.5503104E−01 | −3.8898595E+01 | −8.5207306E−02 | −3.3918067E+00 |
| A8 | −2.4394766E+00 | 4.1490311E+01 | −1.2601141E−01 | 3.4541198E+00 |
| A9 | 2.6508981E+00 | −2.4201929E+01 | 1.7612538E−02 | −1.9935105E+00 |
| A10 | −8.7790978E−01 | 5.9566435E+00 | 3.9483575E−02 | 4.6367046E−01 |

| Surface Number | 10 | 11 | 12 | 13 |
|---|---|---|---|---|
| KA | −5.9858733E+00 | −5.0000009E+01 | −1.1787918E+01 | −4.0539689E+00 |
| A3 | −1.0363928E−01 | −1.0697421E−01 | −3.2223544E−01 | −1.7516243E−01 |
| A4 | 2.9090961E−01 | 4.5141069E−02 | −2.5615398E−01 | −8.7228759E−02 |
| A5 | 2.6484055E−02 | 1.1969313E−02 | 4.4277431E−02 | 2.4665066E−01 |
| A6 | −2.8948681E−01 | −1.8399287E−02 | −8.5950022E−02 | −1.5058826E−01 |
| A7 | −5.5901445E−02 | −6.5145623E−03 | −7.7588245E−02 | 1.3916903E−02 |
| A8 | 1.3922337E−01 | 1.1524681E−02 | 3.9524540E−02 | 2.1549325E−02 |
| A9 | 5.8223045E−02 | −8.6265817E−04 | −5.4481564E−03 | −9.6268578E−03 |
| A10 | −4.9757008E−02 | −7.9851941E−04 | −1.2011366E−05 | 1.3515955E−03 |

TABLE 10

Example 5

| Surface Number | 2 | 3 | 4 | 5 |
|---|---|---|---|---|
| KA | −6.9763770E−01 | 1.7371847E+00 | −2.5885072E+01 | −4.1793719E+01 |
| A3 | −2.3148382E−02 | 1.1823386E−02 | 3.0025616E−02 | 5.5452932E−02 |
| A4 | 1.5858869E−01 | −2.6161130E−01 | −6.7918992E−01 | −4.6284434E−01 |
| A5 | −3.8696791E−01 | 7.5866050E−01 | 1.4111395E+00 | 2.6182431E+00 |
| A6 | 1.3455817E+00 | −2.1156964E+00 | −4.2811265E+00 | −9.2118443E+00 |
| A7 | −3.5785890E+00 | 2.2430552E+00 | 7.1638941E+00 | 1.7347343E+01 |
| A8 | 5.2022080E+00 | 6.1693864E−02 | −6.1295724E+00 | −1.8760568E+01 |
| A9 | −3.4686147E+00 | −2.4284013E+00 | 3.7331631E−01 | 1.0655077E+01 |
| A10 | 5.4746539E−01 | 1.3633281E+00 | 2.0861388E+00 | −2.3045209E+00 |

| Surface Number | 6 | 7 | 8 | 9 |
|---|---|---|---|---|
| KA | −1.8546396E+01 | −2.3267730E+01 | 2.8694409E+01 | −2.7422177E+00 |
| A3 | −6.9656440E−02 | −1.4702377E−01 | 1.8335851E−02 | −1.1432590E−01 |
| A4 | 3.6376386E−01 | 9.2779496E−01 | −4.5152552E−01 | 1.5798883E−01 |
| A5 | −1.1722732E+00 | −5.5255924E+00 | 6.8486800E−01 | −7.6592736E−01 |
| A6 | 1.9404018E+00 | 1.6902639E+01 | −1.5605500E+00 | 2.3357449E+00 |
| A7 | −3.6074642E−01 | −2.9666269E+01 | −5.1751592E−02 | −3.6708200E+00 |
| A8 | −2.6924542E+00 | 3.0212412E+01 | −1.3195191E−01 | 3.9282227E+00 |
| A9 | 2.9985438E+00 | −1.6658101E+01 | −1.9748691E−03 | −2.3750912E+00 |
| A10 | −1.0369343E+00 | 3.8209797E+00 | 3.5305152E−02 | 5.6520515E−01 |

| Surface Number | 10 | 11 | 12 | 13 |
|---|---|---|---|---|
| KA | −5.2977099E+00 | −4.6270026E+01 | −1.1812850E+01 | −4.0797604E+00 |
| A3 | −2.5161724E−02 | −2.5088384E−02 | −2.2903117E−01 | −1.1894201E−01 |
| A4 | 1.8073674E−01 | −6.9346772E−03 | −2.8815692E−01 | −1.6884388E−01 |
| A5 | 2.0194750E−02 | −4.2904036E−02 | 3.9758580E−01 | 3.2597927E−01 |
| A6 | −1.9650813E−01 | 2.4493077E−02 | −6.3678630E−02 | −1.9365904E−01 |
| A7 | −7.9599266E−02 | 3.7301804E−03 | −7.0842975E−02 | 1.6166184E−02 |
| A8 | 1.0860707E−01 | 1.5859380E−03 | 3.4391570E−02 | 3.2514155E−02 |
| A9 | 6.3978363E−02 | −1.8882748E−03 | −5.2209117E−03 | −1.4861819E−02 |
| A10 | −4.5123591E−02 | 1.0295558E−04 | 1.7549639E−04 | 2.0863763E−03 |

TABLE 11

Example 6
f = 3.038, Bf = 0.935, Fno. = 2.41, 2ω = 80.2, TL = 3.877

| Si | Ri | Di | Ndj | νdj |
|---|---|---|---|---|
| 1 (aperture stop) | ∞ | −0.129 | | |
| *2 | 1.48353 | 0.481 | 1.54492 | 55.89 |
| *3 | 5.89430 | 0.218 | | |
| *4 | 10.23199 | 0.262 | 1.63351 | 23.63 |
| *5 | 2.30136 | 0.100 | | |
| *6 | 3.77092 | 0.394 | 1.54492 | 55.89 |
| *7 | 37.33223 | 0.233 | | |
| *8 | −11.32172 | 0.400 | 1.54492 | 55.89 |
| *9 | −0.97946 | 0.102 | | |
| *10 | −1.79154 | 0.325 | 1.63351 | 23.63 |
| *11 | −1.91796 | 0.102 | | |
| *12 | 3.25074 | 0.325 | 1.54492 | 55.89 |
| *13 | 0.72407 | 0.400 | | |
| 14 | ∞ | 0.145 | 1.51633 | 64.14 |
| 15 | ∞ | 0.439 | | |
| 16 (imaging surface) | ∞ | | | |

*aspherical surface

TABLE 12

Example 6

| Surface Number | 2 | 3 | 4 | 5 |
|---|---|---|---|---|
| KA | −6.2872607E−01 | 6.8677188E+00 | −6.0446027E+00 | −4.2792682E+01 |
| A3 | −4.6920696E−02 | 2.0709156E−02 | 1.9944048E−02 | 3.5906033E−02 |
| A4 | 3.4599541E−01 | −3.7048700E−01 | −5.7401837E−01 | −1.2908121E−01 |
| A5 | −9.1824076E−01 | 1.0966423E+00 | 9.3805935E−01 | 1.4400769E+00 |
| A6 | 1.7545129E+00 | −2.4567067E+00 | −3.3073400E+00 | −6.5085333E+00 |
| A7 | −2.7699361E+00 | 1.8382720E+00 | 6.2242496E+00 | 1.2558552E+01 |
| A8 | 3.9521041E+00 | 9.1757492E−01 | −5.8987134E+00 | −1.2587419E+01 |
| A9 | −3.7119024E+00 | −2.4939143E+00 | 6.5567570E−01 | 6.0095317E+00 |
| A10 | 1.2830653E+00 | 9.6365554E−01 | 1.8579091E+00 | −8.9346778E−01 |

| Surface Number | 6 | 7 | 8 | 9 |
|---|---|---|---|---|
| KA | −1.4887156E+01 | −4.9956685E+01 | 1.1629115E+01 | −2.4290088E+00 |
| A3 | −5.6912036E−02 | −1.6599770E−01 | 2.2348265E−02 | −7.0139107E−02 |
| A4 | 4.3448989E−01 | 1.2480730E+00 | −3.3317302E−01 | 7.2410019E−02 |

TABLE 12-continued

Example 6

| Surface Number | | | | |
|---|---|---|---|---|
| A5 | −1.6065038E+00 | −6.6097493E+00 | 5.7688577E−01 | −4.2539543E−01 |
| A6 | 2.4658366E+00 | 1.8907704E+01 | −3.5828067E−01 | 2.1604707E+00 |
| A7 | −1.7982555E−01 | −3.3178733E+01 | 1.8918943E−02 | −4.0352538E+00 |
| A8 | −3.6326699E+00 | 3.4758070E+01 | −5.7216065E−02 | 4.1215138E+00 |
| A9 | 3.8026544E+00 | −1.9928580E+01 | 2.5814616E−03 | −2.2123149E+00 |
| A10 | −1.2559998E+00 | 4.8680547E+00 | 3.2722538E−02 | 4.7203674E−01 |

| Surface Number | 10 | 11 | 12 | 13 |
|---|---|---|---|---|
| KA | −6.5385747E+00 | −2.9177268E+01 | −9.0748999E+00 | −4.2259820E+00 |
| A3 | −4.4118955E−02 | −1.4653932E−01 | −3.6252001E−01 | −1.7105206E−01 |
| A4 | 2.4943152E−01 | 8.3142565E−02 | −2.8734485E−01 | −5.3611639E−02 |
| A5 | −6.9190473E−02 | 5.8581337E−02 | 5.3460522E−01 | 1.8785365E−01 |
| A6 | −1.5949792E−01 | −5.4434105E−02 | −1.2690232E−01 | −1.2099698E−01 |
| A7 | −1.1289235E−02 | −2.7815580E−02 | −9.8506193E−02 | 1.7083394E−02 |
| A8 | 5.7510037E−02 | 2.7664655E−02 | 5.9999193E−02 | 1.4549274E−02 |
| A9 | 5.3241580E−02 | 5.7095066E−04 | −9.2781506E−03 | −7.9100825E−03 |
| A10 | −3.4841967E−02 | −2.3676939E−03 | −1.7894119E−04 | 1.2884735E−03 |

TABLE 13

Values Related to Conditional Formulae

| Formula | Condition | Example 1 | Example 2 | Example 3 | Example 4 | Example 5 | Example 6 |
|---|---|---|---|---|---|---|---|
| (1) | f/f4 | 1.9 | 2.09 | 1.58 | 1.57 | 1.74 | 1.56 |
| (2) | f/f1 | 0.68 | 0.75 | 0.84 | 0.84 | 0.81 | 0.87 |
| (3) | f/f23456 | 0.2 | 0.1 | −0.04 | −0.04 | 0.04 | −0.09 |
| (4) | (R1f − R1r)/(R1f + R1r) | −0.39 | −0.48 | −0.54 | −0.54 | −0.57 | −0.6 |

What is claimed is:

1. An imaging lens consisting of six lenses, including, in order from the object side to the image side:
   a first lens having a positive refractive power and a convex surface toward the object side;
   a second lens having a negative refractive power;
   a third lens, which is a meniscus lens having a positive refractive power and a convex surface toward the object side;
   a fourth lens having a positive refractive power;
   a fifth lens having a negative refractive power and a concave surface toward the object side; and
   a sixth lens having a negative refractive power, of which the surface toward the image side is of an aspherical shape which is concave in the vicinity of the optical axis and convex at the peripheral portion thereof;
   the conditional formulae below being satisfied:

$$1.54 < f/f4 < 3 \quad (1)$$

$$0.5 < f/f1 < 1 \quad (2)$$

wherein f is the focal length of the entire lens system, f1 is the focal length of the first lens, and f4 is the focal length of the fourth lens.

2. An imaging lens as defined in claim 1, in which the conditional formula below further is satisfied:

$$-0.3 < f/f23456 < 0.4 \quad (3)$$

wherein f23456 is the combined focal length of the second lens through the sixth lens.

3. An imaging apparatus as defined in claim 1, wherein: the second lens is a meniscus lens having a convex surface toward the object side.

4. An imaging lens as defined in claim 1, wherein: the fourth lens is a meniscus lens having a concave surface toward the object side.

5. An imaging lens as defined in claim 1, in which the conditional formula below is satisfied:

$$-0.7 < (R1f - R1r)/(R1f + R1r) < 0 \quad (4)$$

wherein $R1f$ is the paraxial radius of curvature of the surface of the first lens toward the object side, and $R1r$ is the paraxial radius of curvature of the surface of the first lens toward the image side.

6. An imaging lens as defined in claim 1, further comprising:
   an aperture stop positioned at the object side of the surface of the second lens toward the object side.

7. An imaging lens as defined in claim 1, in which the conditional formula below is further satisfied:

$$1.55 < f/f4 < 2.5 \quad (1\text{-}1).$$

8. An imaging lens as defined in claim 1, in which the conditional formula below is further satisfied:

$$0.6 < f/f1 < 0.95 \quad (2\text{-}1)$$

wherein f1 is the focal length of the first lens.

9. An imaging lens as defined in claim 1, in which the conditional formula below is further satisfied:

$$-0.2 < f/f23456 < 0.3 \quad (3\text{-}1)$$

wherein f23456 is the combined focal length of the second lens through the sixth lens.

10. An imaging lens as defined in claim 1, in which the conditional formula below is further satisfied:

$$-0.65 < (R1f - R1r)/(R1f + R1r) < -0.1 \quad (4\text{-}1)$$

wherein $R1f$ is the paraxial radius of curvature of the surface of the first lens toward the object side, and $R1r$ is the paraxial radius of curvature of the surface of the first lens toward the image side.

11. An imaging lens as defined in claim 1, in which the conditional formula below is further satisfied:

$$1.55 < f/f4 < 2.2 \quad (1\text{-}2).$$

12. An imaging lens as defined in claim 1, in which the conditional formula below is further satisfied:

$$0.65 < f/f1 < 0.9 \quad (2\text{-}2)$$

wherein f1 is the focal length of the first lens.

13. An imaging lens as defined in claim 1, in which the conditional formula below is further satisfied:

$$-0.15 < f/f23456 < 0.25 \quad (3\text{-}2)$$

wherein f23456 is the combined focal length of the second lens through the sixth lens.

14. An imaging lens as defined in claim 1, in which the conditional formula below is further satisfied:

$$-0.62 < (R1f - R1r)/(R1f + R1r) < -0.2 \quad (4\text{-}2)$$

wherein $R1f$ is the paraxial radius of curvature of the surface of the first lens toward the object side, and $R1r$ is the paraxial radius of curvature of the surface of the first lens toward the image side.

15. An imaging apparatus comprising the imaging lens defined in claim 1.

* * * * *